US012684218B2

(12) United States Patent
Yoshioka et al.

(10) Patent No.: US 12,684,218 B2
(45) Date of Patent: Jul. 14, 2026

(54) ENDOSCOPE SYSTEM AND METHOD OF OPERATING THE SAME

(71) Applicant: FUJIFILM Corporation, Tokyo (JP)

(72) Inventors: Masato Yoshioka, Kanagawa (JP); Satoshi Ozawa, Kanagawa (JP); Makoto Sugizaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/959,628

(22) Filed: Nov. 26, 2024

(65) Prior Publication Data

US 2025/0175689 A1     May 29, 2025

(30) Foreign Application Priority Data

Nov. 27, 2023     (JP) ................................ 2023-199885

(51) Int. Cl.
*H04N 23/50* (2023.01)
*H04N 23/56* (2023.01)
*H04N 25/705* (2023.01)
(52) U.S. Cl.
CPC .......... *H04N 23/555* (2023.01); *H04N 23/56* (2023.01); *H04N 25/705* (2023.01)
(58) Field of Classification Search
CPC ............ A61B 1/2736; A61B 1/000095; A61B 1/0051; A61B 1/04; A61B 1/0638; A61B 1/0655; A61B 1/0661; A61B 1/31
See application file for complete search history.

(56) References Cited

U.S. PATENT DOCUMENTS

| | | | |
|---|---|---|---|
| 2003/0164952 A1* | 9/2003 | Deichmann ............ | B33Y 50/00 356/603 |
| 2013/0027515 A1* | 1/2013 | Vinther .................. | G01B 11/25 348/E13.02 |
| 2014/0071239 A1* | 3/2014 | Yokota ............... | A61B 1/00193 348/45 |

(Continued)

FOREIGN PATENT DOCUMENTS

JP        2019187598        10/2019

OTHER PUBLICATIONS

Yang et al. "Light switching microprojector allows endoscopic in vivo 3D imaging of gastrointestinal abnormalities." Advanced Photonics Research 4.2. Dec. 23, 2022.*

*Primary Examiner* — Fabio S Lima
(74) *Attorney, Agent, or Firm* — JCIPRNET

(57) ABSTRACT

An endoscope system according to an exemplary embodiment of the invention includes: an endoscope; an air supply device; and a processor, in which the processor controls emission of illumination light with which a subject is illuminated and measurement light for measuring a distance between a plurality of points on the subject and the endoscope. At a first air supply volume, the subject is imaged by emitting the measurement light and by emitting the illumination light with a light intensity suppressed relative to the measurement light or turning off the illumination light, and a region of the subject is calculated from obtained first distance information. At a second air supply volume, the subject is imaged by emitting the measurement light and by emitting the illumination light with a light intensity suppressed relative to the measurement light or turning off the illumination light, and a region of the subject is calculated from obtained second distance information.

14 Claims, 17 Drawing Sheets

(56)      References Cited

U.S. PATENT DOCUMENTS

| | | | |
|---|---|---|---|
| 2015/0265784 A1* | 9/2015 | Lampert | A61B 1/00006 |
| | | | 604/26 |
| 2015/0348253 A1* | 12/2015 | Bendall | H04N 7/183 |
| | | | 348/86 |
| 2017/0360286 A1* | 12/2017 | Kaku | A61B 1/0605 |
| 2019/0320886 A1 | 10/2019 | Yano | |
| 2021/0038061 A1* | 2/2021 | Uesugi | A61M 13/00 |
| 2021/0290864 A1* | 9/2021 | Yamaoka | A61M 13/003 |

* cited by examiner

DISTANCE
MEASUREMENT
AND VOLUME
MEASUREMENT

SUBJECT
OBSERVATION

MEASUREMENT
POINT
CONFIRMATION

SPECIFIC
RANGE
INFORMATION

Figure 17:
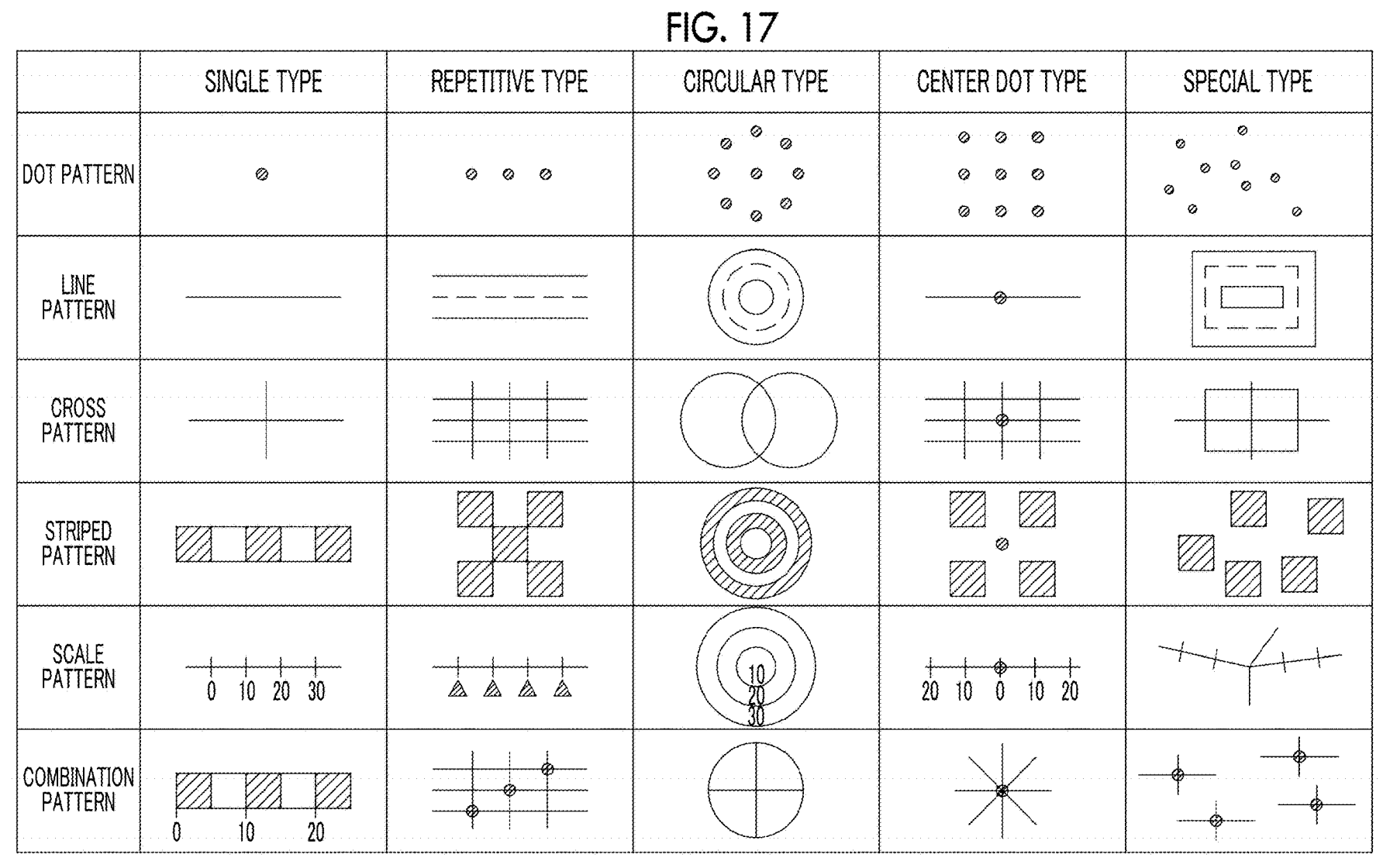

| | SINGLE TYPE | REPETITIVE TYPE | CIRCULAR TYPE | CENTER DOT TYPE | SPECIAL TYPE |
|---|---|---|---|---|---|
| DOT PATTERN | | | | | |
| LINE PATTERN | | | | | |
| CROSS PATTERN | | | | | |
| STRIPED PATTERN | | | | | |
| SCALE PATTERN | | | | | |
| COMBINATION PATTERN | | | | | |

ENDOSCOPE SYSTEM AND METHOD OF OPERATING THE SAME

CROSS-REFERENCE TO RELATED APPLICATIONS

This application claims priority under 35 U.S.C § 119(a) to Japanese Patent Application No. 2023-199885 filed on 27 Nov. 2023. The above application is hereby expressly incorporated by reference, in its entirety, into the present application.

BACKGROUND OF THE INVENTION

1. Field of the Invention

The present invention relates to an endoscope system and a method of operating the same.

2. Description of the Related Art

In recent years, in a medical field, diagnosis or the like using an endoscope system has become widespread, and there is a method of diagnosing functional diseases of a digestive tract using the endoscope system. The functional diseases of the digestive tract include functional dyspepsia (FD), irritable bowel syndrome (IBS), and the like, and the digestive tract is less likely to distend than in a healthy person. Observing the digestive tract and measuring the distensibility can support the diagnosis of the functional diseases.

Various observation methods have been proposed for diagnosing the digestive tract using the endoscope system. For example, there is a three-dimensional measurement method of projecting a pattern onto a subject using measurement light different from illumination light with which the subject is illuminated. The measurement of the distensibility of the digestive tract can be implemented by performing the observation before and after the air supply to the digestive tract using an endoscope having an air supply function. As an example of a device that measures a size of the subject, which is a diseased area, using an endoscope that performs three-dimensional measurement while normally observing the subject, there is an endoscope device disclosed in JP2019-187598A (Corresponding to US2019/0320886A1).

The endoscope device of JP2019-187598A has a technique in which an endoscope having an air and water supply nozzle emits auxiliary measurement light in a pulsed manner at specific frame intervals with respect to imaging with only illumination light to image the subject, and measures an observation distance of the subject. The size of the subject is measured from an image captured using the auxiliary measurement light.

SUMMARY OF THE INVENTION

In the measurement of the size of the subject using the auxiliary measurement light of JP2019-187598A, the auxiliary measurement light is emitted together with the illumination light, so that mucous membrane reflection and halation of the illumination light become disturbances, and recognition accuracy of the pattern light due to the auxiliary measurement light decreases. In a case in which the recognition accuracy decreases, reliability of a measurement result of the size of the subject, particularly a change in size, decreases.

An object of the present invention is to provide an endoscope system and a method of operating the same that calculate a region of a subject with high recognition accuracy while performing endoscopic observation.

An endoscope system according to an aspect of an exemplary embodiment of the invention comprises: an endoscope that images a subject; an air supply device that is connected to the endoscope and that supplies air at a multi-stage air supply volume through a distal end part of the endoscope; and a processor, in which the processor controls emission of illumination light with which the subject is illuminated and measurement light for measuring a distance between a plurality of points on the subject and the endoscope, in a state in which the air supply volume is a first air supply volume, acquires a first imaging signal from the endoscope that images the subject by emitting the measurement light and by emitting the illumination light at a light intensity suppressed relative to the measurement light or turning off the illumination light, in a state in which the air supply volume is a second air supply volume at a stage different from the first air supply volume, acquires a second imaging signal from the endoscope that images the subject by emitting the measurement light and by emitting the illumination light at a light intensity suppressed relative to the measurement light or turning off the illumination light, calculates a region of the subject from first distance information obtained by measuring the distance between the plurality of points on the subject and the endoscope based on the first imaging signal, and calculates a region of the subject from second distance information obtained by measuring the distance between the plurality of points on the subject and the endoscope based on the second imaging signal.

It is preferable that the endoscope images the subject by dividing the subject for each specific angle according to a field of view, and that the processor measures the first distance information based on a plurality of first division imaging signals obtained by imaging the subject for each specific angle, and measures the second distance information based on a plurality of second division imaging signals obtained by imaging the subject for each specific angle.

It is preferable that the processor discriminates a specific part in the subject, calculates a region of the specific part from the first distance information, and calculates a region of the specific part from the second distance information.

It is preferable that the measurement light is pattern light in which spot light beams are arranged in a lattice form.

It is preferable that the region is at least any one of a length which is a one-dimensional region, a surface area which is a two-dimensional region, or a volume which is a three-dimensional region.

It is preferable that the endoscope applies a light intensity threshold value that is a preset threshold value of a light intensity in the emission of the measurement light and the illumination light, and in a case in which the measurement light is emitted and the illumination light is emitted at a light intensity suppressed relative to the measurement light, performs measurement irradiation in which the measurement light is emitted at a light intensity equal to or greater than the light intensity threshold value and the illumination light is emitted at a light intensity less than the light intensity threshold value.

It is preferable that the endoscope continuously images the subject by switching between the measurement irradiation and observation irradiation in which the subject is irradiated with the illumination light at a light intensity equal to or greater than the light intensity threshold value, and that the processor displays, on a screen, an observation endoscope image generated by imaging the subject with the observation irradiation.

It is preferable that the endoscope continuously images the subject by switching between the measurement irradiation and measurement point confirmation irradiation in which the subject is irradiated with the illumination light and the measurement light at a light intensity equal to or greater than the light intensity threshold value, and that the processor displays, on a screen, a dual-light endoscope image generated by imaging the subject with the measurement point confirmation irradiation.

It is preferable that the processor displays, on a screen, a measurement light image generated by imaging the subject with the measurement irradiation.

It is preferable that the processor performs different screen displays for each type of the generated image.

It is preferable that the endoscope continuously images the subject by switching between the measurement irradiation, observation irradiation in which the illumination light is emitted at a light intensity equal to or greater than the light intensity threshold value, and measurement point confirmation irradiation in which the subject is irradiated with the illumination light and the measurement light at a light intensity equal to or greater than the light intensity threshold value, and that the processor displays, on different screens, an observation endoscope image generated by imaging the subject with the observation irradiation and a dual-light endoscope image generated by imaging the subject with the measurement point confirmation irradiation.

An endoscope system according to another aspect of the exemplary embodiment of the invention comprises: an endoscope that images a subject; an air supply device that is connected to the endoscope and that supplies air at a multi-stage air supply volume through a distal end part of the endoscope; and a processor, in which the processor controls emission of illumination light with which the subject is illuminated and measurement light for measuring a distance between the subject and the endoscope, in a state in which the air supply volume is a first air supply volume, acquires a first imaging signal from the endoscope that images the subject by emitting the measurement light and by emitting the illumination light at a light intensity suppressed relative to the measurement light or turning off the illumination light, in a state in which the air supply volume is a second air supply volume at a stage different from the first air supply volume, acquires a second imaging signal from the endoscope that images the subject by emitting the measurement light and by emitting the illumination light at a light intensity suppressed relative to the measurement light or turning off the illumination light, and calculates and outputs an index value representing an extension amount of the subject by using a difference between first distance information obtained by measuring distances between a plurality of points on the subject and the endoscope based on the first imaging signal and second distance information obtained by measuring the distance between the plurality of points on the subject and the endoscope based on the second imaging signal.

It is preferable that the processor calculates a volume of the subject based on the index value.

A method of operating an endoscope system according to still another aspect of the exemplary embodiment of the invention comprises: a step of, via an air supply device, supplying air at a multi-stage air supply volume through a distal end part of an endoscope that images a subject; a step of controlling emission of illumination light with which the subject is illuminated and measurement light for measuring a distance between a plurality of points on the subject and the endoscope; a step of acquiring a first imaging signal from the endoscope that images the subject by emitting the measurement light and by emitting the illumination light at a light intensity suppressed relative to the measurement light or turning off the illumination light, in a state in which the air supply volume is a first air supply volume; a step of acquiring a second imaging signal from the endoscope that images the subject by emitting the measurement light and by emitting the illumination light at a light intensity suppressed relative to the measurement light or turning off the illumination light, in a state in which the air supply volume is a second air supply volume at a stage different from the first air supply volume; a step of calculating a region of the subject from first distance information obtained by measuring the distance between the plurality of points on the subject and the endoscope based on the first imaging signal; and a step of calculating a region of the subject from second distance information obtained by measuring the distance between the plurality of points on the subject and the endoscope based on the second imaging signal.

According to the exemplary embodiments of the invention, it is possible to calculate a region of a subject with high recognition accuracy while performing endoscopic observation.

BRIEF DESCRIPTION OF THE DRAWINGS

FIG. 16 is an explanatory diagram of imaging a subject with a seventh observation pattern.

FIG. 17 is an explanatory diagram of a projection pattern with measurement light.

DESCRIPTION OF THE PREFERRED EMBODIMENTS

Figure 1:
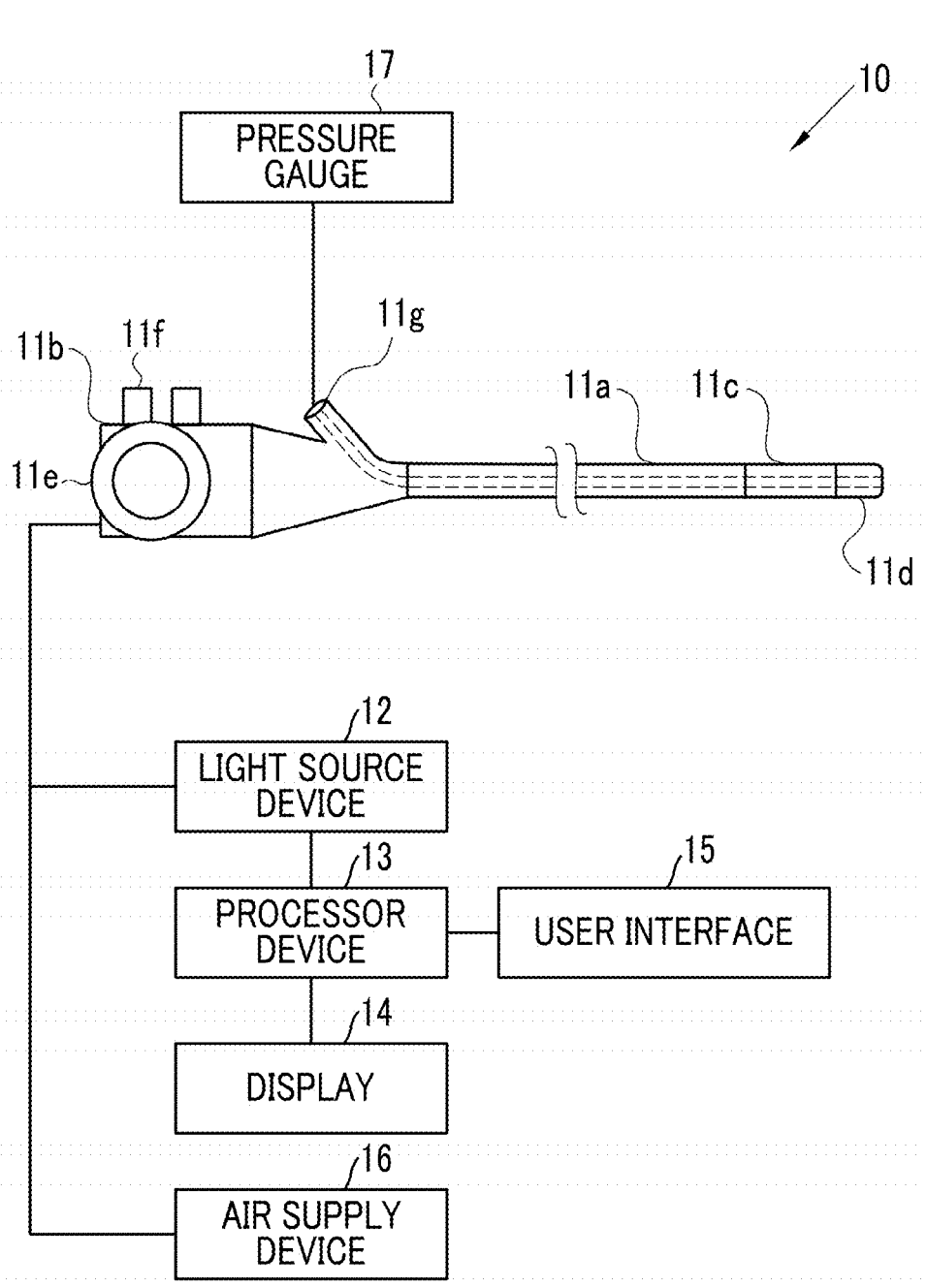
FIG. 1 is a schematic view of an endoscope system.

As shown in FIG. 1, an endoscope system 10 according to an exemplary embodiment of the invention includes an endoscope 11, a light source device 12, a processor device 13, a display 14, a user interface (UI) 15, an air supply device 16, and a pressure gauge 17. The endoscope 11 is optically connected to the light source device 12 and electrically connected to the processor device 13. The light source device 12 supplies illumination light to the endoscope 11. In addition, the endoscope 11 is physically connected to the air supply device 16 and the pressure gauge 17. The air supply device 16 supplies measurement gas to the endoscope 11.

The endoscope 11 emits illumination light and acquires an endoscope image by imaging a subject. The endoscope 11 has an insertion part 11a that is to be inserted into the subject such as a digestive tract, and an operation part 11b that is provided at a base end portion of the insertion part 11a. A bendable part 11c and a distal end part 11d are provided on a distal end side of the insertion part 11a. The bendable part 11c is operated by the operation part 11b to be bent in a desired direction. The distal end part 11d irradiates the subject with illumination light and receives reflected light from the subject to image the subject. The operation part 11b is provided with a mode selector switch 11e that is used for an operation for switching a mode and an air supply switch 11f that controls the air supply from the air supply device 16.

The processor device 13 is electrically connected to the display 14 and the user interface 15. The processor device 13 receives an image signal from the endoscope 11, and performs various kinds of processing based on the image signal. An external recording unit (not shown), which records an image, image information, and the like, may be connected to the processor device 13. The display 14 outputs and displays a captured image of the subject, image information, and the like, which have been image-processed by the processor device 13. The user interface 15 includes a keyboard, a mouse, a touch pad, a microphone, a foot pedal, and the like, and has a function of receiving an input operation such as function setting.

Figure 2:
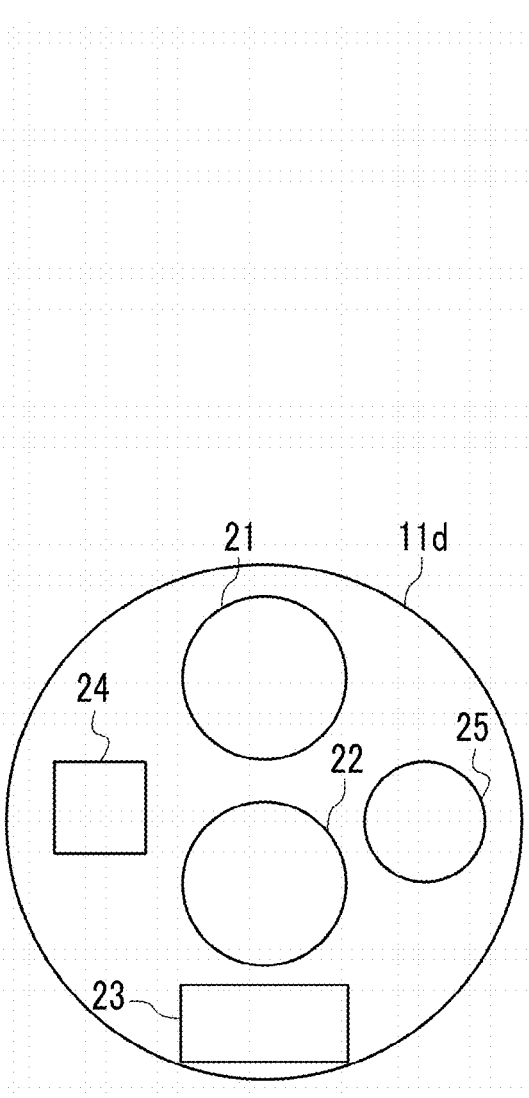
FIG. 2 is an explanatory diagram of an endoscope distal end part as viewed from the front.

As shown in FIG. 2, the distal end part 11d of the endoscope 11 viewed from the front is substantially circular, and is provided with an illumination lens 21 that emits illumination light supplied from the light source device 12, an objective lens 22 that receives light from the subject, a measurement light emitting unit 23 that emits measurement light supplied from the light source device 12 in an optional pattern, an air supply nozzle 24 that supplies measurement gas supplied from the air supply device 16, and a distal end part forceps port 25 that is connected to a body part forceps port 11g through a forceps channel. In addition, the measurement light emitting unit 23 may be used as a separate body from the endoscope 11. In this case, the measurement light is emitted by a probe having a function of the measurement light emitting unit 23 and being insertable and removable from a forceps port.

The air supply device 16 supplies the measurement gas to the endoscope 11 in response to pressing of the air supply switch 11f. The measurement gas is supplied into a living body from the air supply nozzle 24 via an air supply channel passing through the endoscope 11. The measurement gas is, for example, carbon dioxide gas or air, and is supplied to the digestive tract. In addition, the air supply device 16 may be electrically connected to the processor device 13, and may be automatically operated to supply air by setting an air supply pattern for controlling an air supply timing, air supply output, and the like. In addition, the air supply output, which is an air supply volume per unit time, is controlled. Unless otherwise specified, the air is supplied at any fixed output.

The pressure gauge 17 measures a pressure of the gas transmitted through a tube connected to the body part forceps port 11g. The gas to be transmitted passes through the forceps channel inside the insertion part 11a from the distal end part forceps port 25 to the body part forceps port 11g. In a case in which the distal end part 11d of the endoscope 11 is inserted into a specific digestive tract, the pressure gauge 17 can measure an internal pressure of the specific digestive tract. The pressure transmitted to the pressure gauge 17 is changed according to a volume of the measurement gas supplied into the digestive tract and a state of the specific digestive tract. The pressure gauge 17 is electrically connected to the processor device 13 and transmits the measured internal pressure information to the processor device 13 as needed.

Figure 3:
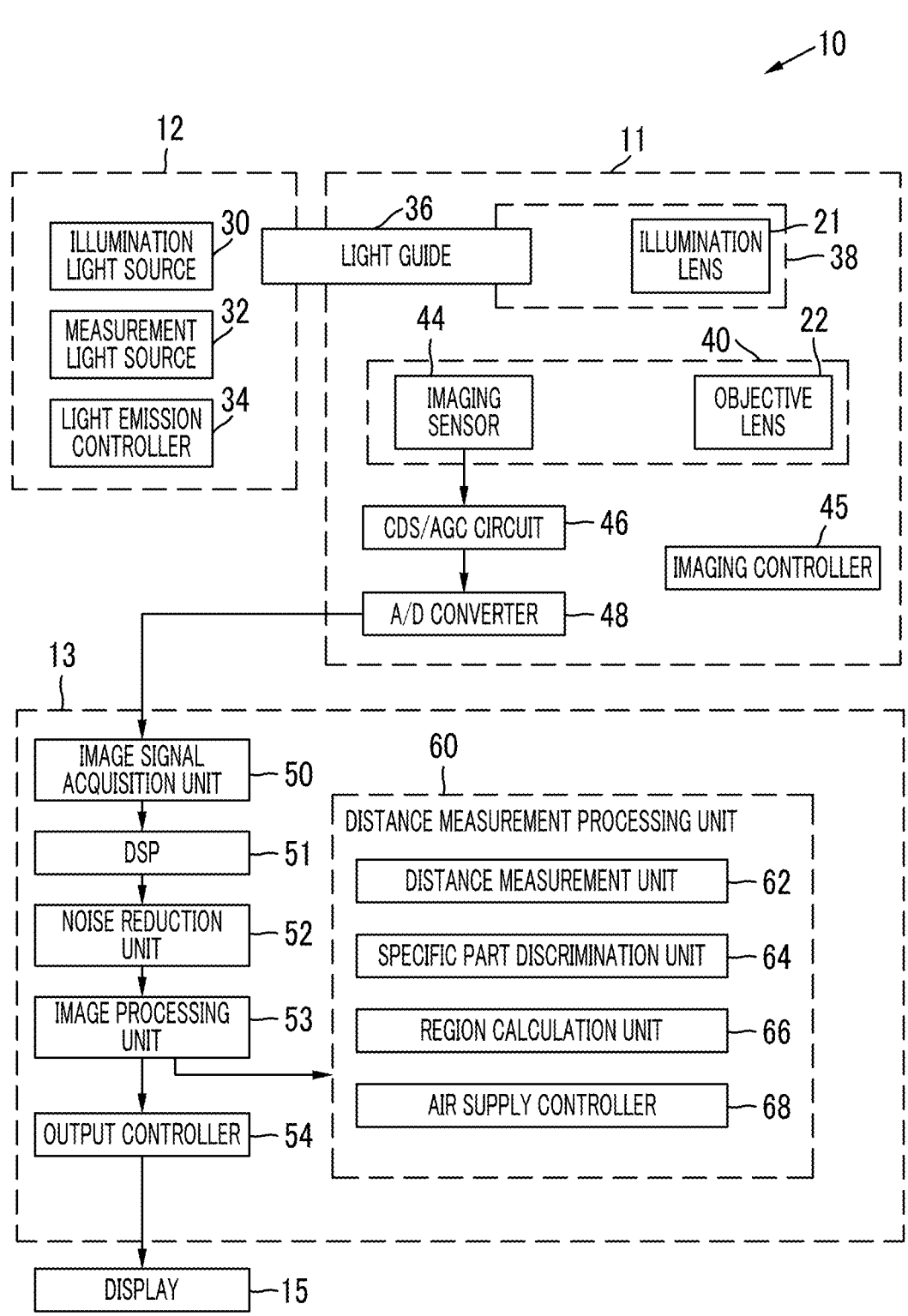
FIG. 3 is a block diagram showing a function of the endoscope system.

As shown in FIG. 3, in the endoscope system 10, the light source device 12 propagates emitted illumination light to the endoscope 11 via a light guide 36, the endoscope 11 transmits an image signal imaged using illumination light to the processor device 13, and the processor device 13 generates an image to be displayed on the display 14.

The light source device 12 comprises an illumination light source 30 that emits a plurality of illumination light beams having different main wavelengths or illumination light, which is white light, a measurement light source 32 that emits measurement light having a wavelength different from that of the illumination light source 30 and used for measurement, and a light emission controller 34 that controls a light emission timing, a light emission intensity, and the like of the illumination light source 30 and the measurement light source 32. The measurement light source 32 is preferably a laser light source. In addition, the measurement light source 32 may be provided in an implementation pattern, such as a case in which it is provided in the illumination light source 30, a case in which it is provided in the endoscope 11, or a case in which it is provided in another device such as a measurement light source device different from the light source device 12.

A function of the light emission controller 34 is implemented by a light source control processor (not shown) provided in the light source device 12, and the light emission controller 34 controls the illumination light emitted by the illumination light source 30 and the measurement light emitted by the measurement light source 32. In a case in which the light source device 12 and the processor device 13 are electrically connected, the function of the light source control processor may be implemented by a central controller instead of the light source control processor. The light emission controller 34 adjusts a drive current based on a preset light emission pattern.

The illumination light and the measurement light are incident into the light guide 36. The light guide 36 is built in the endoscope 11 and a universal cord (a cord connecting the endoscope 11, the light source device 12, and the processor device 13). The light guide 36 propagates the light from the light source device 12 to the distal end part 11d of the endoscope 11.

The distal end part 11d is provided with an illumination optical system 38 and an imaging optical system 40. The illumination light propagated by the light guide 36 is applied to the subject via the illumination lens 21 included in the illumination optical system 38. In addition, the measurement light propagated by the light guide 36 is applied to the subject via the measurement light emitting unit 23 included in the illumination optical system 38. The imaging optical system 40 includes an objective lens 42 and an imaging sensor 44. Reflected light of the illumination light and the measurement light returning from the subject is incident into the imaging sensor 44 via the objective lens 42. Thereby, an image of the subject is formed on the imaging sensor 44 which is a color imaging sensor.

The measurement light is used to measure distances to a plurality of points at once, and is applied to the subject with a pattern for acquiring distance information. For example, the measurement light is pattern light in which spot light beams are repeated in any pattern, that is, arranged in a lattice form.

An imaging controller 45 drives and controls the imaging sensor 44 according to the mode selector switch 11e, an instruction input from the user interface 15 via the processor device 13, and a signal from the light emission controller 34 to perform mode switching of the observation mode and control the imaging in each mode. In the control of the imaging, adjustment of an exposure period through setting of a shutter speed of an electronic shutter (not shown) of the imaging sensor 44 is performed.

Unless otherwise specified, the imaging sensor 44 has a constant length of an imaging frame, and is therefore controlled to alternately repeat an accumulation period and a readout period every predetermined time, for example, 60 frames per second (fps), that is, 1/60 seconds. The shutter speed of the electronic shutter may be changed to adjust the length of the imaging frame.

As the imaging sensor 44, a photoelectric conversion element such as a charge coupled device (CCD) sensor or a complementary metal-oxide semiconductor (CMOS) sensor is used. The imaging sensor 44 performs, for example, an accumulation operation of performing photoelectric conversion of received light and accumulating signal charges corresponding to the intensity of received light for each pixel and a readout operation of reading out the accumulated signal charges, within an acquisition period of one frame. The signal charge for each pixel read out from the imaging sensor 44 is converted into a voltage signal and is input to a correlated double sampling/automatic gain control (CDS/ AGC) circuit 46. The light source device 12 generates illumination light in accordance with a timing of the accumulation operation of the imaging sensor 44 and causes the illumination light to be incident into the light guide 36.

Each pixel of the imaging sensor 44 is provided with any of a blue pixel (B pixel) having a blue (B) color filter, a green pixel (G pixel) having a green (G) color filter, or a red pixel (R pixel) having a red (R) color filter. For example, the imaging sensor 44 is preferably a color imaging sensor of a Bayer array in which a ratio of the number of pixels of the B pixels, the G pixels, and the R pixels is 1:2:1.

The B color filter mainly transmits light in a blue band, specifically, light of which a wavelength range is 380 to 560 nm (blue transmission range). A peak wavelength at which a transmittance is maximized exists around 460 to 470 nm. The G color filter mainly transmits light in a green band, specifically, light of which a wavelength range is 450 to 630 nm (green transmission range). The R color filter mainly transmits light in a red band, specifically, light of which a wavelength range is 580 to 760 nm (red transmission range).

In addition, a complementary color imaging sensor comprising complementary color filters corresponding to cyan (C), magenta (M), yellow (Y), and green (G) may be used instead of the primary color imaging sensor 44. In a case in which the complementary color imaging sensor is used, image signals corresponding to four colors of C, M, Y, and G are output. Therefore, in a case in which the image signals corresponding to four colors of C, M, Y, and G are converted into image signals corresponding to three colors of R, G, and B by complementary color-primary color conversion, image signals corresponding to the same respective colors of R, G, and B as those of the imaging sensor 44 can be obtained.

The CDS/AGC circuit 46 performs correlated double sampling (CDS) or automatic gain control (AGC) on the analog image signals obtained from the imaging sensor 44. The image signal that has passed through the CDS/AGC circuit 46 is converted into a digital image signal by an analog/digital (A/D) converter 48. The digital image signal after the A/D conversion is input to the processor device 13.

In the processor device 13, a program related to each processing is incorporated in a program memory (not shown). In a case in which a central controller (not shown) configured by a processor executes the program in the program memory, functions of an image signal acquisition unit 50, a digital signal processor (DSP) 51, a noise reduction unit 52, an image processing unit 53, and an output controller 54 are implemented.

The image signal acquisition unit 50 receives an image signal input from the endoscope 11 whose drive is controlled by the imaging controller 45 and transmits the received image signal to the DSP 51. The output controller 54 transmits an image signal of an image to be displayed, which is acquired from the image processing unit 53, to the display 14.

The DSP 51 performs various kinds of signal processing, such as defect correction processing, offset processing, gain correction processing, linear matrix processing, gamma conversion processing, demosaicing, and YC conversion processing, on the received image signal. In the defect correction processing, a signal of a defective pixel of the imaging sensor 44 is corrected. In the offset processing, a dark current component is removed from the image signal that has passed through the defect correction processing, and an accurate zero level is set. In the gain correction processing, a signal level of each image signal is adjusted by multiplying the image signal of each color after the offset processing by a specific gain. The image signal of each color after the gain correction processing is subjected to the linear matrix processing for enhancing color reproducibility.

After that, brightness and chroma saturation of each image signal are adjusted by the gamma conversion processing. The image signal after the linear matrix processing is subjected to the demosaicing (also referred to as isotropic processing or synchronization processing), and a signal of a color missing from each pixel is generated by interpolation. By the demosaicing, all pixels have signals of respective colors of R, G, and B. The DSP 51 performs the YC conversion processing on each image signal after the demosaicing, and outputs a brightness signal Y, a color difference signal Cb, and a color difference signal Cr to the noise reduction unit 52.

The noise reduction unit 52 performs noise reduction processing by, for example, a moving average method or a median filter method on the image signal that has passed through the demosaicing or the like by the DSP 51. The image signal with reduced noise is input to the image processing unit 53.

The image processing unit 53 further performs color conversion processing, such as 3×3 matrix processing, gradation transformation processing, and three-dimensional look up table (LUT) processing, on the input image signal for one frame. Then, various kinds of color enhancement processing are performed on the RGB image data that has been subjected to the color conversion processing. Structure enhancement processing such as spatial frequency enhancement is performed on the RGB image data that has been subjected to the color enhancement processing. The image processing unit 53 outputs the RGB image data that has passed through the structure enhancement processing to the output controller 54 or a distance measurement processing unit 60 as an image. The RGB image data may be output to another device that is different from the processor device 13 and that has at least a function of the distance measurement processing unit 60 described below, instead of the distance measurement processing unit 60.

The output controller 54 sequentially acquires a measurement light image, an observation endoscope image, or a dual-light endoscope image, and converts the acquired images into video signals that enable full-color display on the display 14. The converted video signal is output to and displayed on the display 14. Accordingly, a doctor or the like can observe the subject by using a still image or a video image of the observation endoscope image.

The distance measurement processing unit 60 performs distance measurement on the subject using the measurement light image, the observation endoscope image, or the dual-light endoscope image acquired by the image processing unit 53, and calculates a surface area or a volume of the subject based on the measured distance information. The distance measurement processing unit 60 has functions of a distance measurement unit 62, a specific part discrimination unit 64, a region calculation unit 66, and an air supply controller 68.

The distance measurement unit 62 performs distance measurement in an image acquired by imaging using the measurement light. Distance information between the distal end part 11*d* and the subject for a measurement position corresponding to a projection pattern of the measurement light is acquired.

The specific part discrimination unit 64 is a target part for which region calculation is performed, and discriminates a range of a specific part in the image. In the specific part discrimination, image recognition for discrimination is performed using pixel information of an image captured with the illumination light.

The image recognition may be executed using a trained model optimized for the recognition processing in the image. In this case, the specific part discrimination unit 64 comprises a recognizer (not shown) having a trained model required for the image recognition, and the recognizer comprises a convolutional neural network (CNN) which is a computer algorithm consisting of a neural network that performs machine learning, is trained in advance with data such as an image group including an image including the specific part to be discriminated and an image not including the specific part, discriminates the specific part in the input image, and outputs position information of the specific part in the input image.

In addition, in the specific part discrimination, in a case in which the distance information is acquired at measurement positions of the number and position where a shape of the subject can be estimated in the image captured with the measurement light, estimated shape discrimination may be performed in which a three-dimensional shape of the imaged subject is estimated and the specific part is discriminated from features of the estimated shape.

The region calculation unit 66 calculates a region of the subject by using the measured distance information. The region is calculated in association with a time series or an air supply volume in a case in which the imaging signal is acquired, and a progression amount of the region at the same point in the subject is obtained. The progression amount is calculated and output as an index value based on a magnification ratio or the like of the region. The region calculation unit 66 calculates, as the region, at least any one of a length which is a one-dimensional region, a surface area which is a two-dimensional region, or a volume which is a three-dimensional region.

The region is a value calculated using an actual measurement value of a surface area of the specific part, and for example, a surface area of a stomach or a volume of the stomach is calculated from a surface area of a fundus part. Therefore, in a case in which the fundus part is measured as the specific part, a table for calculating the volume of the stomach from a size ratio between the fundus part and the stomach or the surface area of the fundus part is stored in advance. In a case in which the length is measured as the region, an elongation amount is obtained from a change in length of the fundus part.

The air supply controller 68 controls air supply in accordance with the observation of the subject via the endoscope 11. The air supply is controlled in a stepwise manner based on passage of time, internal pressure information, or a user operation. In addition, the air supply may be automatically suppressed in a state in which there is no increase in volume of the digestive tract. For example, the air supply controller 68 is electrically connected to the pressure gauge 17, and in a case in which an increase in internal pressure is large with respect to the air supply volume, the air supply controller 68 performs control to reduce or maintain the air supply volume.

Figure 4:
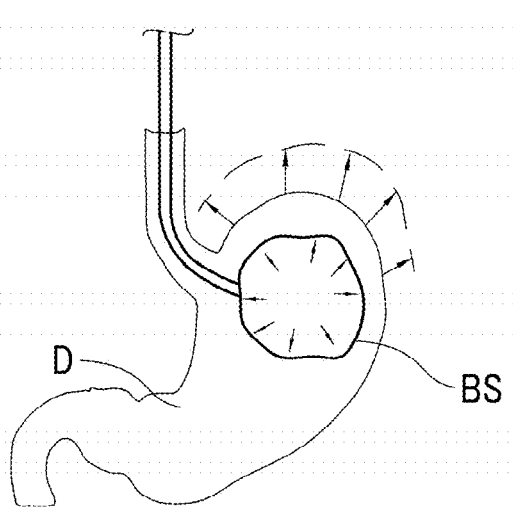
FIG. 4 is an explanatory diagram of a method of inflating a stomach with air supply to a barostat bag.

As shown in FIG. 4, there is a barostat method in a method of measuring a change in internal pressure and volume of the digestive tract, which is executed for the diagnosis of the disease in the related art. In the barostat method, a patient swallows a balloon BS with a tube, and air is supplied via the tube to evenly inflate the balloon BS, thereby pushing out a digestive tract D with an internal pressure of the balloon BS as indicated by an arrow and inflating an upper part of the stomach in an arrow direction. A volume of the balloon BS is obtained using the air supply volume and the internal pressure. On the other hand, the barostat method requires dedicated equipment, causes pain to the patient due to the balloon BS, and makes it difficult to grasp a position of the balloon BS. It is highly invasive and does not allow direct observation of the digestive tract. Therefore, a burden on the patient can be reduced by using a method of directly supplying air to the digestive tract D and inflating the digestive tract D without using the balloon.

Figure 5:
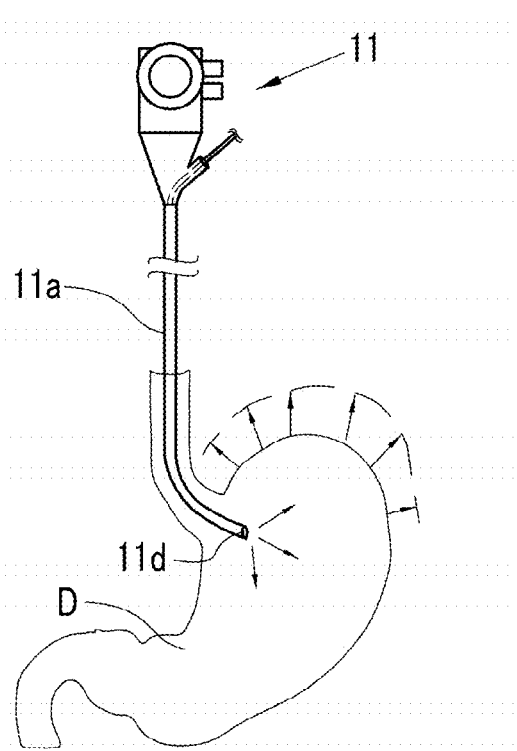
FIG. 5 is an explanatory diagram of a method of inflating a stomach with air supply using an endoscope.

As shown in FIG. 5, the insertion part 11*a* of the endoscope 11 connected to the air supply device 16 is inserted into the digestive tract D and supplies air from the air supply nozzle 24. By performing the imaging during the air supply, the process in which the digestive tract D is inflated in an arrow direction and the observation of the digestive tract D having any internal pressure can be performed. The internal pressure is measured by the pressure of the gas transmitted from the distal end part forceps port 25 to the pressure gauge 17. Since the digestive tract D is inflated with the supply of the measurement gas, a medical device such as the endoscope 11 can measure the internal pressure of the digestive tract and the change in volume and surface area of the digestive tract D with low invasiveness without contacting the subject.

The digestive tract observation in which the internal pressure of the digestive tract and the region are measured using the endoscope system 10 will be described using contents of observing and measuring the stomach inflated with the air supply as a subject S and the fundus part as a specific part.

The endoscope system 10 of the present embodiment performs observation by optionally switching between a normal observation mode in which illumination light is continuously turned on and normal observation is performed and a measurement mode in which an operation of turning on and off two types of light having different wavelengths, that is, illumination light and measurement light, is repeated in units of frames to perform distance measurement and volume calculation of the subject. The observation mode is switched by a user operation such as pressing the mode selector switch 11e.

Figure 6:
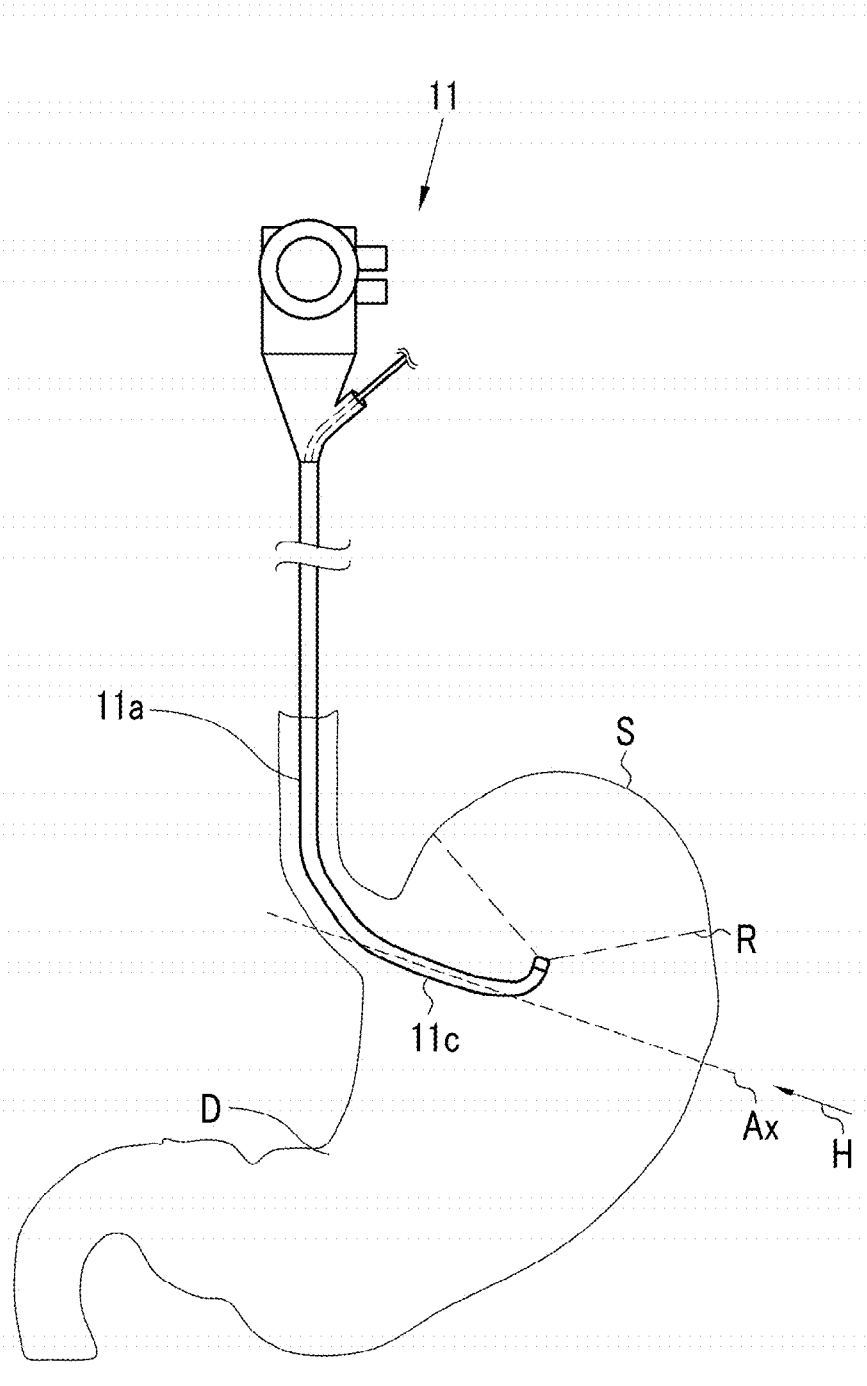
FIG. 6 is an explanatory diagram of an endoscope that performs observation together with air supply.

As shown in FIG. 6, the subject S in the digestive tract D is observed using the endoscope 11. The subject S captured in an imaging range R is imaged as an endoscope image. In a case in which an imaging range of one endoscope image is insufficient because the subject is in a wide range relative to the imaging range R, such as a specific part, or in a case in which a three-dimensional structure of the subject S is accurately grasped, the bendable part 11c of the insertion part 11a inserted into the subject is rotated to divide the subject S for each specific angle according to a field of view and perform imaging. For example, the bendable part 11c is rotated along a rotation axis Ax set with reference to any viewpoint H to capture an endoscope image with the field of view according to the number of divisions or the angle of view. The rotation axis Ax is optionally set based on a positional relationship between the distal end part 11d and the specific part, or a shape of the specific part.

The bendable part 11c may be bent to rotate the distal end part 11d, which is the imaging position, based on the rotation axis Ax set with reference to any viewpoint H with respect to the subject S, thereby capturing an image of 360 degrees. In this case, with the endoscope 11 with an angle of view of 120 degrees or more, an endoscope image in which the subject S can be observed in 360 degrees is obtained using division imaging signals obtained by dividing the field of view into three parts for 120 degrees set as a specific angle. In addition, in a case in which the angle of view is 90 degrees or more and 120 degrees or less, an endoscope image may be captured in which the field of view is divided into four parts for 90 degrees set as a specific angle. An endoscope image in which the subject S in a range wider than the imaging range R is captured can be created by combining division imaging signals acquired continuously or at specific intervals with a close imaging timing, such as within 3 seconds.

In the normal observation mode, an endoscope image captured by the irradiation with illumination light suitable for observing the subject S is generated and displayed on a screen. In the normal observation, the illumination light is continuously turned on during the observation, and the exposure period is adjusted by the opening and closing of the shutter or the like. In the normal observation mode, the inflated digestive tract can be observed by any output of the air supply.

In the measurement mode, the air supply device 16 connected to the endoscope 11 that images the subject supplies the air from the distal end part 11d at a multi-stage air supply volume, and controls emission of the illumination light with which the subject S is illuminated and the measurement light for measuring distances between a plurality of points on the subject S and the endoscope 11 to capture the endoscope image.

The multi-stage air supply volume is a total amount of the gas that is supplied to the digestive tract at any time point in a state in which the air supply output is fixed at any output. For example, in a case in which the interval is set to 5 seconds after the start of the air supply in the measurement mode, an air supply volume at a time point 5 seconds after the start of the air supply is defined as a first air supply volume, and an air supply volume at a time point 10 seconds after the start of the air supply is defined as a second air supply volume. Similarly, the imaging may be performed at a third air supply volume at a time point 15 seconds after the start of the air supply and a fourth air supply volume at a time point 20 seconds after the start of the air supply. In addition, the time points at which the measurement is performed do not need to be equally spaced, and a speed of distension can be measured more accurately by measuring the start of distension at frequent intervals.

Figures 7A, 7B, 7C:
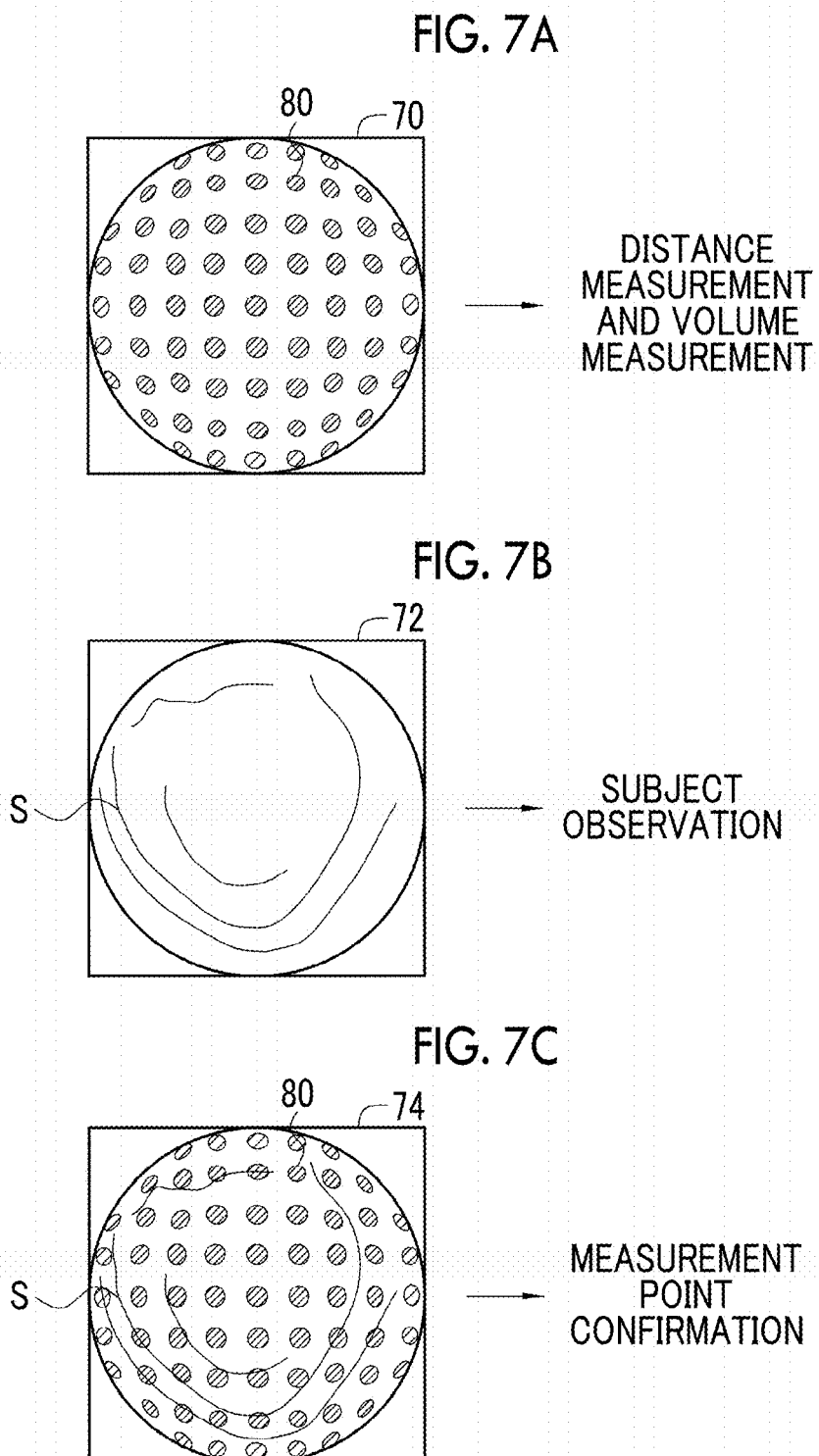
FIG. 7A is a measurement light image captured with measurement light.
FIG. 7B is an observation endoscope image captured with illumination light.
FIG. 7C is a dual-light endoscope image captured with measurement light and illumination light, each of the images being acquired in observation in a measurement mode.

As shown in FIGS. 7A to 7C, in the measurement mode, as the endoscope image, a measurement light image 70 in which a distance and a volume of the subject S are calculated, an observation endoscope image 72 in which the subject S is observed, and a dual-light endoscope image 74 in which the measurement point of the subject S is confirmed and observed are acquired. A measurement light pattern 80 is projected onto the subject S by the irradiation with the measurement light. FIG. 7A shows the measurement light image 70 in which the subject S is imaged with first irradiation in which the measurement light is emitted by the endoscope 11 and the illumination light is emitted at a light intensity suppressed relative to the measurement light or is turned off, and which is generated by the processor device 13. The measurement light will be described using a projection pattern in which a dot pattern is repeated at equal intervals, but any pattern such as a line pattern or a cross pattern may be used. In addition, the pattern intervals do not have to be equal. FIG. 7B shows the observation endoscope image 72 in which the subject S is imaged with second irradiation in which the illumination light is emitted by the endoscope 11, and which is generated by the processor device 13 and is used for the subject observation. As shown in FIG. 7C, the dual-light endoscope image 74 in which the subject S is imaged with third irradiation in which the illumination light and the measurement light are emitted by the endoscope 11 is generated by the processor device 13 and is used for the confirmation of the measurement point and the observation of the subject S.

The suppressed intensity of the illumination light is a light intensity that does not hinder the distance measurement with the measurement light, and is controlled according to a preset threshold value. As a result, in the measurement light image 70, it is possible to confirm a position or a shape of the imaged subject by preventing the disturbance of the measurement point due to the measurement light caused by mucous membrane reflection light and halation of the illumination light.

In the measurement mode, the imaging is performed by controlling the emission of the illumination light and the measurement light. In addition, the air supply is controlled together with the light emission. In the first irradiation, at least a first imaging signal and a second imaging signal, which are imaging signals at a plurality of different stages of the air supply volume, are acquired. That is, in a state in which the air supply device 16 supplies air at the first air supply volume, which is any stage of the air supply volume, the first imaging signal obtained by imaging the subject S by emitting the measurement light and by emitting the illumination light at a light intensity suppressed relative to the measurement light or turning off the illumination light is acquired. In addition, in a state in which the air supply device 16 supplies air at the second air supply volume different from the first air supply volume, the second imaging signal obtained by imaging the subject S by emitting the measurement light and by emitting the illumination light at a light intensity suppressed relative to the measurement light or turning off the illumination light is acquired.

With the first imaging signal and the second imaging signal, the subject S is imaged using the measurement light pattern 80 from which the distance information at the plurality of measurement points in the subject S is obtained. A region of the subject S is calculated by first distance information obtained by measuring the distances between the plurality of points on the subject S and the endoscope 11 based on the first imaging signal, and a region of the subject S is calculated by second distance information obtained by measuring the distances between the plurality of points on the subject S and the endoscope 11 based on the second imaging signal. The region includes a one-dimensional region which is a length, a two-dimensional region which is a surface area, and a three-dimensional region which is a volume, and both are calculated to obtain the distensibility of the digestive tract. The first distance information and the second distance information are distance information for the specific part at the same position where the air supply volume is different.

A plurality of the division imaging signals acquired by the imaging in which the subject S is divided for each specific angle according to the field of view in the measurement mode are used to the distance measurement. Under an imaging condition in which the field of view in the imaging range R is 120 degrees or more, the bendable part 11c is rotated to acquire the division imaging signals obtained by dividing the field of view into three parts for 120 degrees, and the distance measurement is performed based on the three division imaging signals. In addition, the distance measurement is also performed under an imaging condition in which division imaging signals obtained by dividing the field of view into four parts for 90 degrees are acquired. Specific range discrimination to be described below may be executed for each divided imaging signal, or may be executed after integrating the distance information obtained from the divided imaging signal.

At the first air supply volume, the first distance information is measured based on a plurality of first division imaging signals obtained by imaging the subject S for each specific angle, and, at the second air supply volume, the second distance information is measured based on a plurality of second division imaging signals obtained by imaging the subject S for each specific angle. The number of divisions and whether or not to execute the division are determined according to the imaging condition of the subject S that changes according to the air supply volume.

Figure 8:
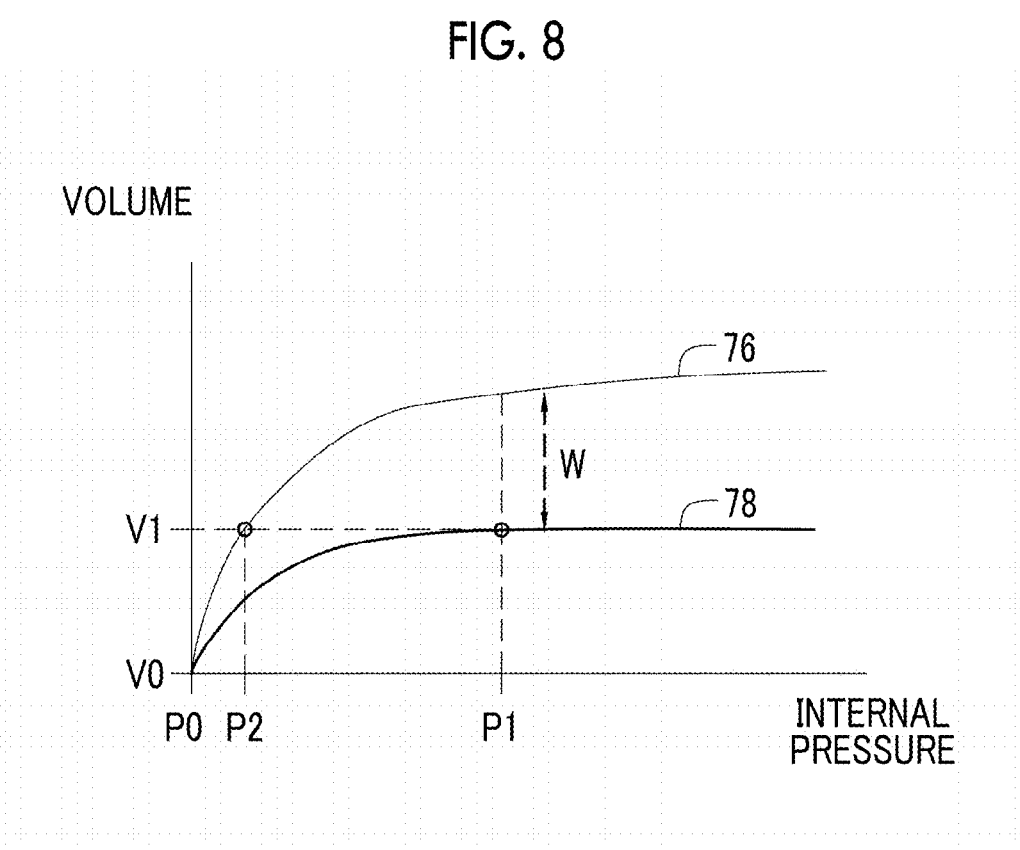
FIG. 8 is an explanatory diagram showing a relationship between an internal pressure and a volume of a gastric fundus part in a healthy person and in a patient with a functional disease of a digestive tract.

A patient with a disease in the function of the digestive tract may experience a symptom such as difficulty in distending the digestive tract such as the fundus part of the stomach compared to a healthy person in whom the function of the digestive tract is normal. Specifically, an upper limit value of the volume of the stomach, which increases due to the increase in the internal pressure, is small, and a pace of increase in volume in response to the increase in the internal pressure is gentle. As shown in FIG. 8, the presence or absence of an abnormality in the function of the digestive tract is discriminated using a relationship between the volume and the internal pressure of the digestive tract, and it can be expected that a difference in a healthy curve 76 appears based on a relationship between the internal pressure and volume changes in the fundus part of the stomach of the healthy person and a difference in a functional disease curve 78 appears based on a relationship between the internal pressure and volume changes in the fundus part of the stomach of the functional dyspepsia patient.

In a case in which the digestive tract is inflated with air supply or the like from a reference internal pressure value P0 and a reference volume value V0 in a state in which the digestive tract is not inflated, the volume increase is stopped at an internal pressure value P1 and a volume value V1 in the functional disease curve 78. On the other hand, in the healthy curve 76, the volume increases even in a case in which the internal pressure further increases from the internal pressure value P1. In addition, the volume value V1 at which the volume increase is stopped in the functional disease curve 78 is implemented at an internal pressure value P2 which is a pressure smaller than the internal pressure value P1 in the healthy curve 76.

Since the patient feels pain in a case in which the increase amount of the volume is zero or small with respect to the increase in the internal pressure value, in the volume observation using the air supply, it is preferable to terminate the air supply or decrease the air supply volume in a case in which the increase rate of the volume with respect to the internal pressure is calculated to be equal to or less than a preset proportion. A volume width W is obtained by comparing the volumes between the two curves at the same internal pressure. Regardless of the volume width W, by comparing the healthy curve 76, which shows the relationship between the volume and the internal pressure in the gastric fundus part of a typical healthy person measured in advance, with the functional disease curve 78, which shows the relationship between the volume and the internal pressure obtained by measurement, it is possible to grasp the state of the functional disease.

Figure 9:
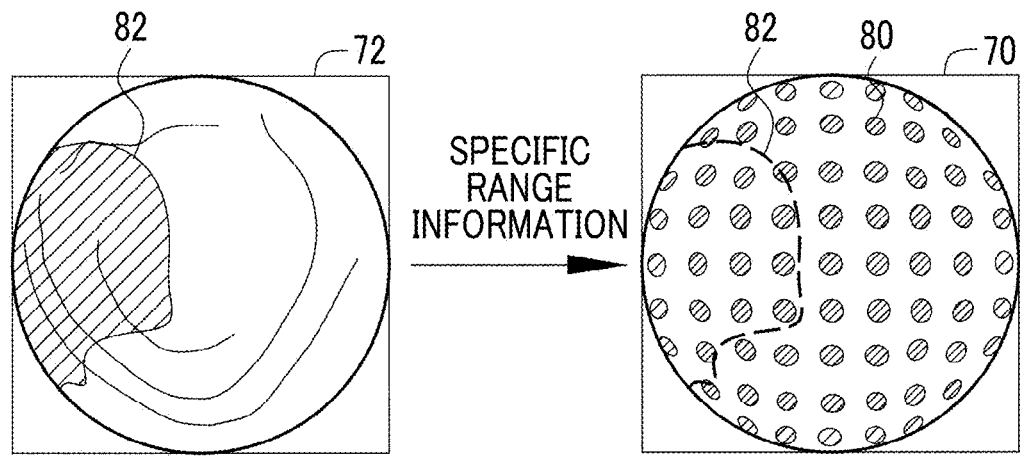
FIG. 9 is an explanatory diagram of determining a specific part in a subject.

As shown in FIG. 9, the specific part discrimination unit 64 discriminates the specific part in the subject S imaged by using the illumination light as a specific range 82. In a case in which the specific part is the fundus part, the specific range 82 is used to discriminate a region occupied by the fundus part by, for example, performing image recognition on the observation endoscope image 72 using the recognizer. The discriminated region is associated with position information in the observation endoscope image 72, as specific range information. The specific range information is applied to the measurement light image 70 of a frame before and after, in the imaging timing, the observation endoscope image 72 used for the discrimination, and the measurement light image 70 uses the distance information of the measurement point included in the specific range 82. In a case in which the fundus part is imaged by being divided into a plurality of images captured under the same imaging conditions, the divided captured images are used to detect the specific range and discriminate the specific part.

In addition, in the measurement light image 70, in a case in which a measurement light pattern in a lattice form or the like is projected onto the entire image and a density of the measurement point with respect to the image is large, a three-dimensional shape of the subject S may be calculated based on the distance information and the fundus part may be specified. In a case in which a projection range of the measurement light pattern is limited or the density of the measurement point on the image is small, the specific range 82 may be detected by using the measurement light image 70 in which illumination is performed using the suppressed illumination light or the dual-light endoscope image 74. In this case, the region where the pattern light is present is not used for measurement or the influence of the measurement light is reduced by relatively reducing the weighting in the image recognition.

In the measurement mode, the change in region of the specific part is measured from the difference in the distance information acquired at the plurality of stages of the air supply volume, and the progression amount, which is the elongation amount of the subject S, is calculated. The difference between the first distance information and the second distance information acquired in at least two stages of the first and second air supply volumes is used. In a case of the stage of the air supply volume set in the calculation of the progression amount, for example, an air supply volume corresponding to a time series, an index value indicating a rate of change of the observation distance in a time series can be calculated. In a case of the division with the internal pressure, an index value indicating a rate of change of the region in response to a change in internal pressure can be calculated. In a case in which the subject expands, the observation distance indicated by the distance information of the measurement point at the same position is longer.

The stages of the air supply volume include an initial stage which is immediately after the start of the air supply or in which no air is supplied and the air supply volume is negligible, an expansion stage in which the subject expands as the air supply volume increases, an upper limit stage in which the internal pressure increases mainly after the air supply volume exceeds a predetermined volume and the expansion of the subject almost stops, and the like. For the comparison with a healthy state, at least the region of the specific part in the upper limit stage of the air supply volume is used. It is preferable that the measurement interval in the imaging is determined based on the time series or the internal pressure.

The progression amount is calculated using the region of the specific part in at least two stages of the subject expansion, for example, the initial stage and the upper limit stage. For example, in a case in which the air supply volume at the initial stage is defined as the first air supply volume and the air supply volume at the upper limit stage is defined as the second air supply volume, the minimum distance information of the subject S is calculated from the first distance information, and the maximum distance information of the subject S is calculated from the second distance information, so that the maximum progression amount in the subject S is obtained. The region of the subject S calculated from the index value is at least any of the surface area or the volume. A difference between an average distance in the first distance information and an average distance in the second distance information may be calculated, and used as an index value representing the maximum progression amount.

In addition, the distance information with an equal air supply volume, which is optionally set at the expansion stage, is measured and the internal pressure at each air supply volume is measured to calculate the volume of the subject S, whereby an index value indicating the progression amount of the subject in a time series is obtained.

In addition, the distance information corresponding to the internal pressure can be obtained by setting the first air supply volume, the second air supply volume, and the nth air supply volume based on the equal-interval changes of the internal pressure by using the pressure gauge 17, and can be calculated as an index value indicating the progression amount between any internal pressures.

In the measurement mode, the distance measurement is performed using an active stereo method of actively emitting the measurement light to perform three-dimensional measurement. In the active stereo method, there is a method of using the projection of the measurement light and a principle of triangulation using a camera. In addition, the measurement may be performed in combination with an optical radar method using a time difference or a phase difference of the measurement light measured by a time of flight (TOF) sensor. For example, in the active stereo method, the projected measurement light is observed with a camera function of the endoscope 11, and the measurement light is observed using the TOF sensor comprising the measurement light emitting unit 23 or the tool to be inserted into the forceps port. In a case of using the TOF sensor including the tool to be inserted into the forceps port, a method that does not interfere with pressure measurement is adopted, such as using the endoscope 11 comprising a plurality of forceps ports.

The extraction of the spot light, which is return light of the measurement light, in the measurement light image 70 is executed by binarization processing by comparison with a predetermined threshold value based on the light intensity. The predetermined threshold value is, for example, a preset extraction threshold value applied to the return light of the illumination light and the measurement light for the brightness or the luminance. In a case in which the light emission is performed at a light intensity suppressed relative to the measurement light, the measurement light is emitted such that the light intensity thereof is equal to or greater than an extraction threshold value at which the return light is extracted by the binarization processing, and the suppressed illumination light is emitted such that the light intensity thereof is less than an extraction threshold value at which the return light is not extracted by the binarization processing, thereby acquiring the measurement light image 70.

Therefore, the light emission controller 34 transmits light with the light intensity obtained by applying a light intensity threshold value, which is a threshold value of the preset light intensity, to the emission of the measurement light and the suppressed illumination light, to the endoscope 11. In measurement irradiation in which the measurement light is emitted and the illumination light is emitted at a light intensity suppressed relative to the measurement light, the endoscope 11 emits the measurement light at a light intensity equal to or greater than a light intensity threshold value and emits the illumination light at a light intensity less than the light intensity threshold value. For example, in the binarization processing using 256 gradations such as brightness values of "0" to "255", a brightness value of "128" is used as the extraction threshold value, the measurement light is emitted with the light intensity in which the return light has a brightness value of "128" or more, and the suppressed illumination light is emitted with the light intensity in which the return light has a brightness value of less than "128". In a case in which only the measurement light is emitted, control of emitting the measurement light in the light intensity in which the return light of the measurement light is equal to or greater than the extraction threshold value is performed. The light intensity threshold value is set to a value obtained by adding an error such as attenuation in the light returning to the extraction threshold value. The intensity of light to be emitted is an integrated light intensity per unit area.

In addition, in order to reduce an error due to the return light and to perform the binarization processing more reliably, light emission may be controlled such that the measurement light is emitted at a light intensity higher than a threshold value by a predetermined proportion, and the suppressed illumination light is emitted at a light intensity lower than the threshold value by a predetermined proportion. For example, the emission of the measurement light is controlled such that a brightness value of "254" increased by 2% from the threshold value is an average brightness value, and the emission of the suppressed illumination light is controlled such that a brightness value of "102" decreased by 2% from the threshold value is an average brightness value.

The distance measurement is performed based on the brightness of each measurement point extracted by the extraction processing on the measurement light image 70. For example, in a case of 256 gradations, the distance of the subject S to the endoscope at each measurement point is measured in 128 stages in the extracted brightness levels of "128" to "255". The distance information of each measurement point obtained by the distance measurement is associated with the measurement light image 70.

In the endoscopic observation performed together with the air supply control, it is preferable to selectively use a plurality of observation patterns. Observation frames based on at least any of the measurement light image 70, the observation endoscope image 72, or the dual-light endoscope image 74 are acquired by switching, and volume measurement and image display are performed. For example, first to seventh observation patterns are switched.

Figure 10:
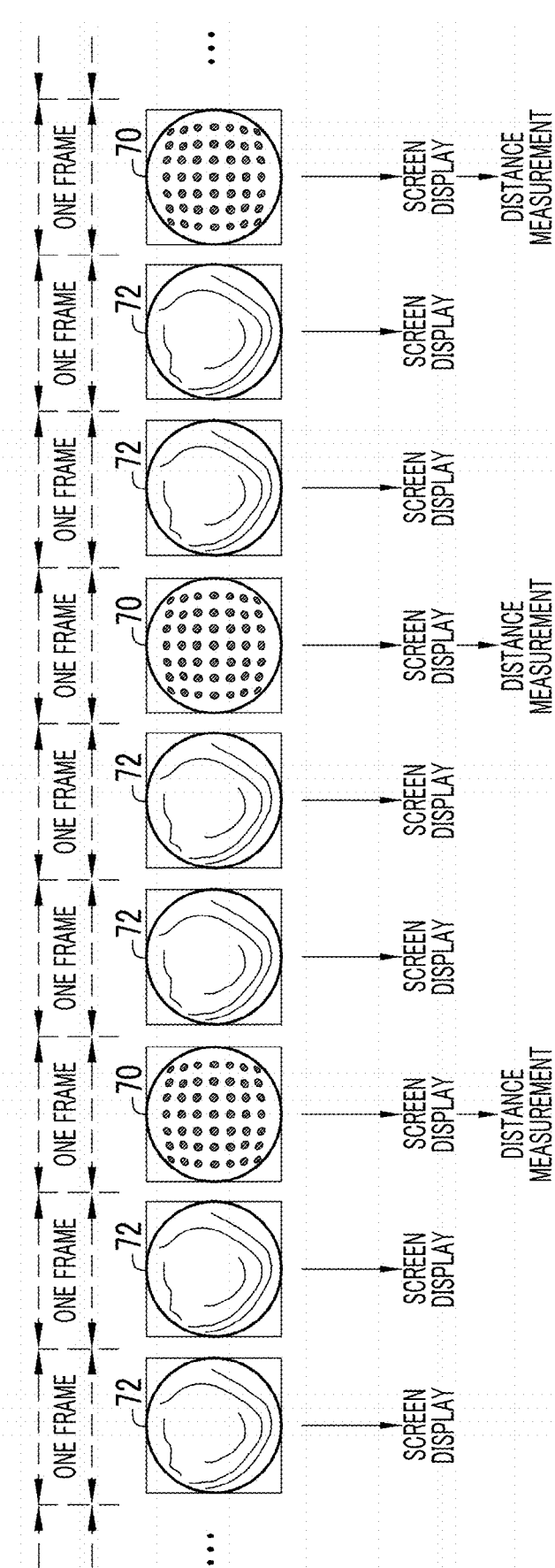
FIG. 10 is an explanatory diagram of imaging a subject with a first observation pattern.

As shown in FIG. 10, in the first observation pattern, the measurement light image 70 and the observation endoscope image 72 are acquired by switching at an optional ratio, and the measurement light image 70 and the observation endoscope image 72 are displayed by switching on the display 14. In addition, the region calculation such as the distance measurement and the volume calculation is performed from the acquired measurement light image 70.

Figure 11:
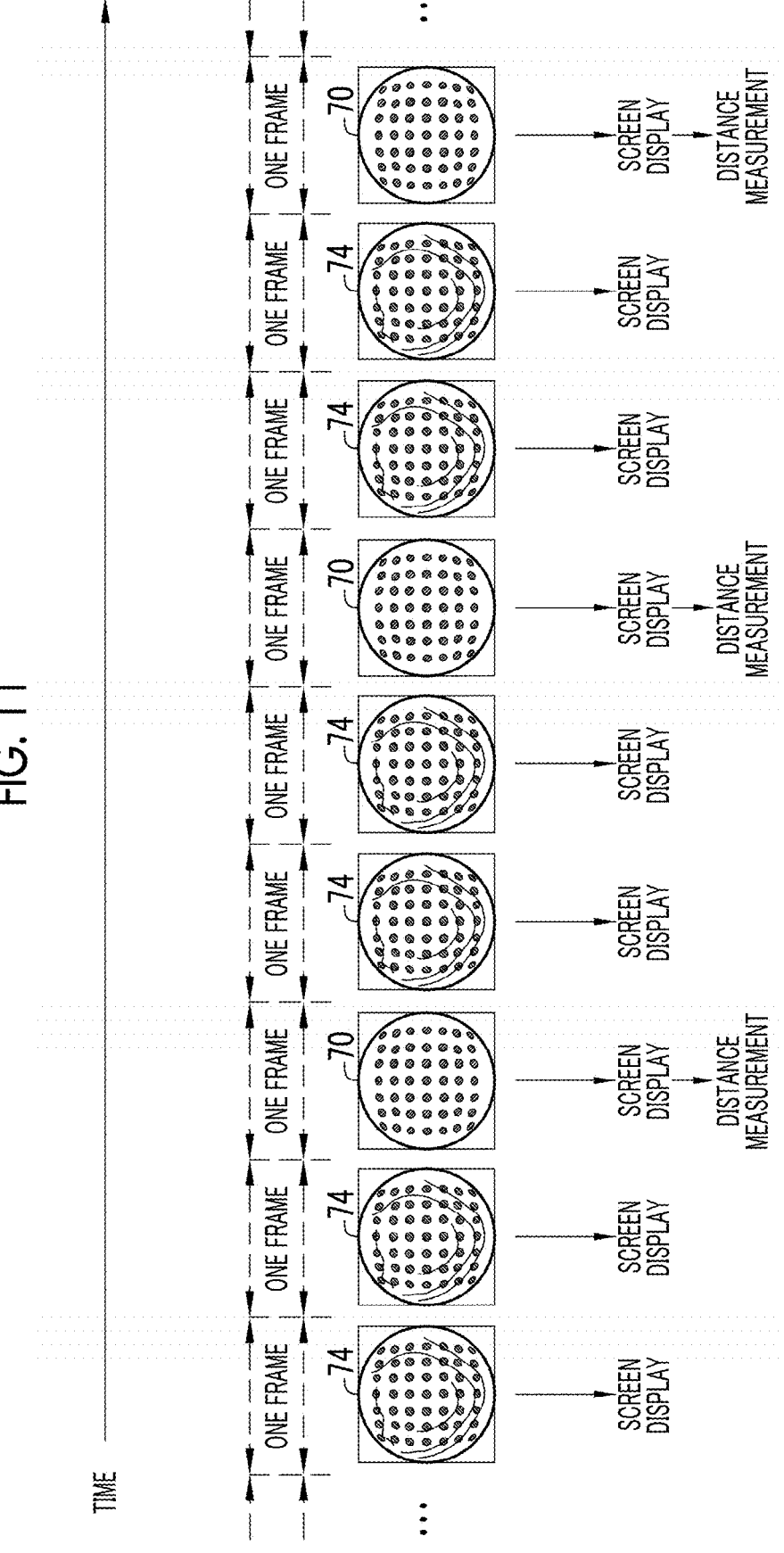
FIG. 11 is an explanatory diagram of imaging a subject with a second observation pattern.

As shown in FIG. 11, in the second observation pattern, the measurement light image 70 and the dual-light endoscope image 74 are acquired by switching at an optional ratio, and the measurement light image 70 and the dual-light endoscope image 74 are displayed by switching on the display 14. In addition, the region calculation such as the distance measurement and the volume calculation is performed from the acquired measurement light image 70.

Figure 12:
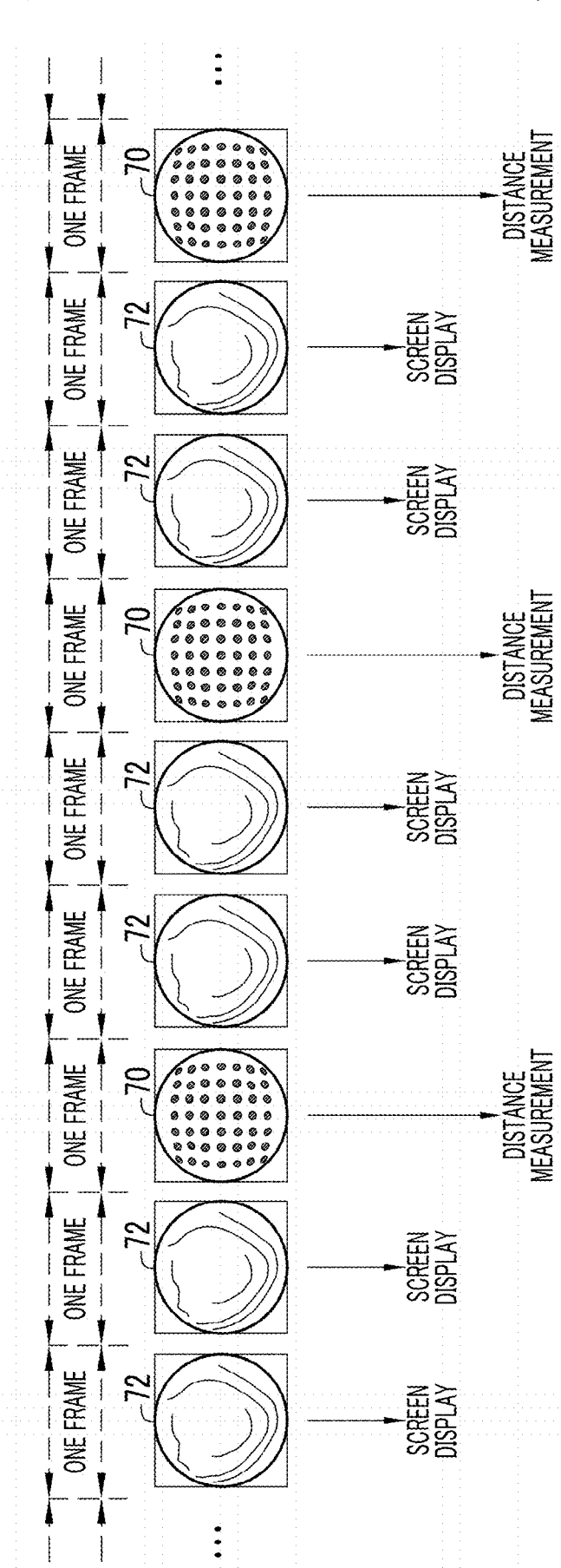
FIG. 12 is an explanatory diagram of imaging a subject with a third observation pattern.

As shown in FIG. 12, in the third observation pattern, the measurement light image 70 and the observation endoscope image 72 are acquired by switching at an optional ratio, and the observation endoscope image 72 is consecutively displayed on the screen. Since the measurement light image 70 for performing the region calculation such as the distance measurement and the volume calculation is not displayed on the screen, the screen does not flicker.

Figure 13:
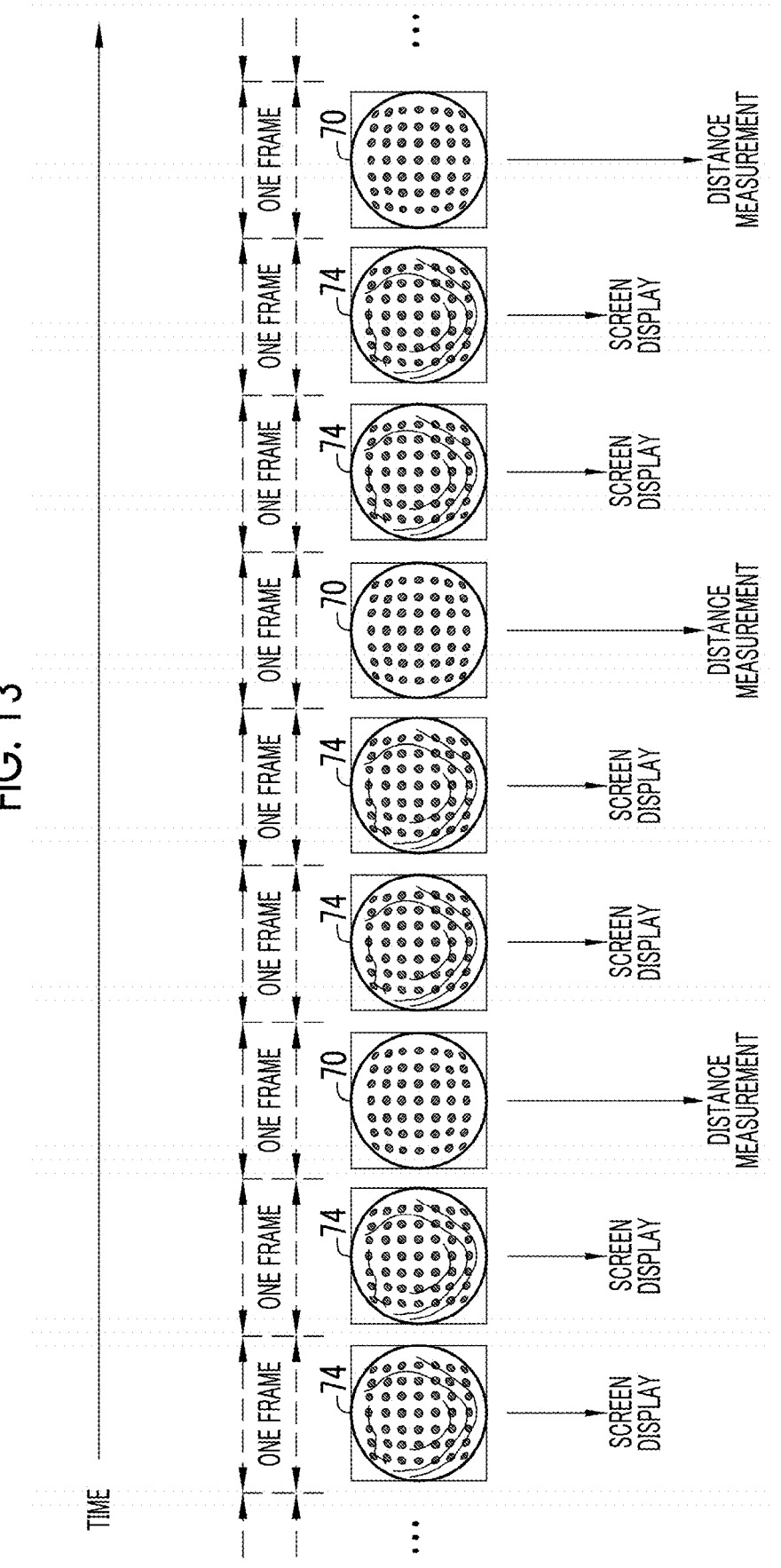
FIG. 13 is an explanatory diagram of imaging a subject with a fourth observation pattern.

As shown in FIG. 13, in the fourth observation pattern, the measurement light image 70 and the dual-light endoscope image 74 are acquired by switching at an optional ratio, and the dual-light endoscope image 74 is consecutively displayed on the screen of the display 14. Since the measurement light image 70 for performing the region calculation such as the distance measurement and the volume calculation is not displayed on the screen, the screen does not flicker.

Figure 14:
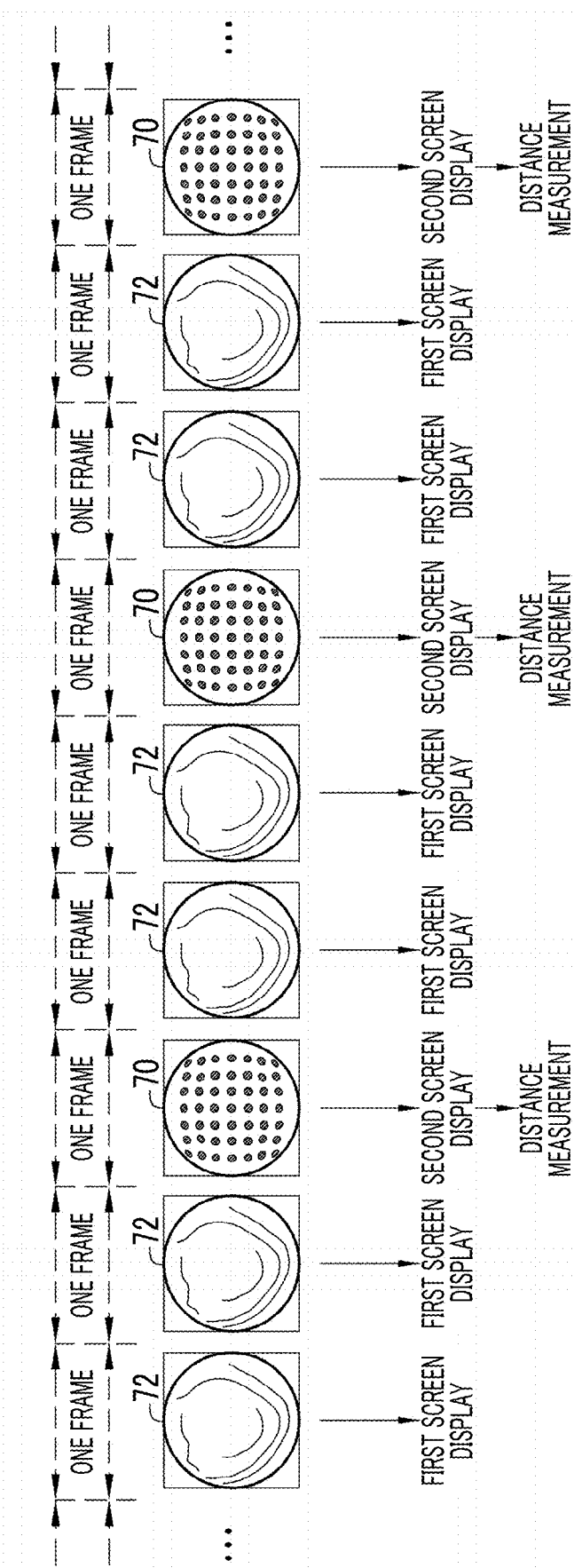
FIG. 14 is an explanatory diagram of imaging a subject with a fifth observation pattern.

As shown in FIG. 14, in the fifth observation pattern, the measurement light image 70 and the observation endoscope image 72 are acquired by switching at an optional ratio, and the measurement light image 70 and the observation endoscope image 72 are consecutively displayed in two screens. For example, the observation endoscope image 72 is displayed on a first screen, and the measurement light image 70 is displayed on a second screen. In addition, the region calculation such as the distance measurement and the volume calculation is performed from the measurement light image 70 displayed on the second screen.

The two-screen display may be implemented by electrically connecting a second display (not shown) different from the display 14 to the processor device 13 and displaying the first screen and the second screen on the respective displays, or may be implemented by dividing the screen of the display 14 into two parts to display the first screen and the second screen. In addition, the distance measurement in each frame of the measurement light image 70 displayed on the second screen may be performed after the screen display is switched to the next frame, or may be performed during the display of the second screen.

Figure 15:
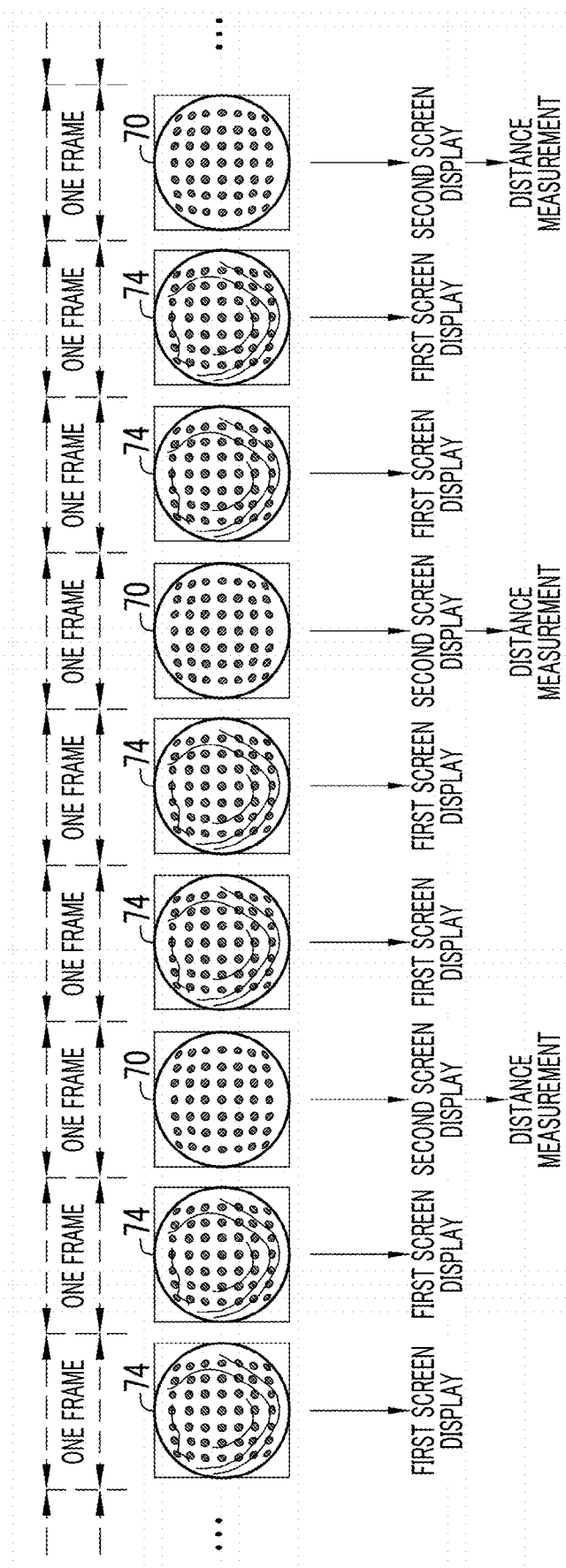
FIG. 15 is an explanatory diagram of imaging a subject with a sixth observation pattern.

As shown in FIG. 15, in the sixth observation pattern, the measurement light image 70 captured by the measurement irradiation and the dual-light endoscope image 74 are acquired by switching at an optional ratio, and the measurement light image 70 and the dual-light endoscope image 74 are consecutively displayed in two screens. In the sixth observation pattern, the two-screen display and the region calculation such as the distance measurement and the volume calculation are performed by the same method as in the fifth observation pattern.

In the first to sixth observation patterns, two frames of the observation endoscope images 72 or two frames of the dual-light endoscope images 74 are acquired alternately with one frame of the measurement light image 70, but the present invention is not limited to this, and the images may be captured alternately in the same number of frames, or the observation endoscope image 72 or the dual-light endoscope image 74 and the measurement light image 70 may be captured alternately by setting the respective consecutive imaging numbers optionally.

In the third to sixth observation patterns, the observation endoscope image 72 or the dual-light endoscope image 74 may be displayed on the screen in accordance with an imaging frame rate, but the frame rate for displaying the images on the screen may be adjusted in accordance with an imaging ratio. For example, in a case in which the observation endoscope image 72 or the dual-light endoscope image 74 and the measurement light image 70 are captured at a frame rate of 60 fps at a ratio of 2:1, the observation endoscope image 72 or the dual-light endoscope image 74 may be displayed on the screen at 40 fps. In addition, the display of the measurement light image 70 in the fifth and sixth observation patterns may be adjusted in accordance with the imaging ratio.

Figure 16:
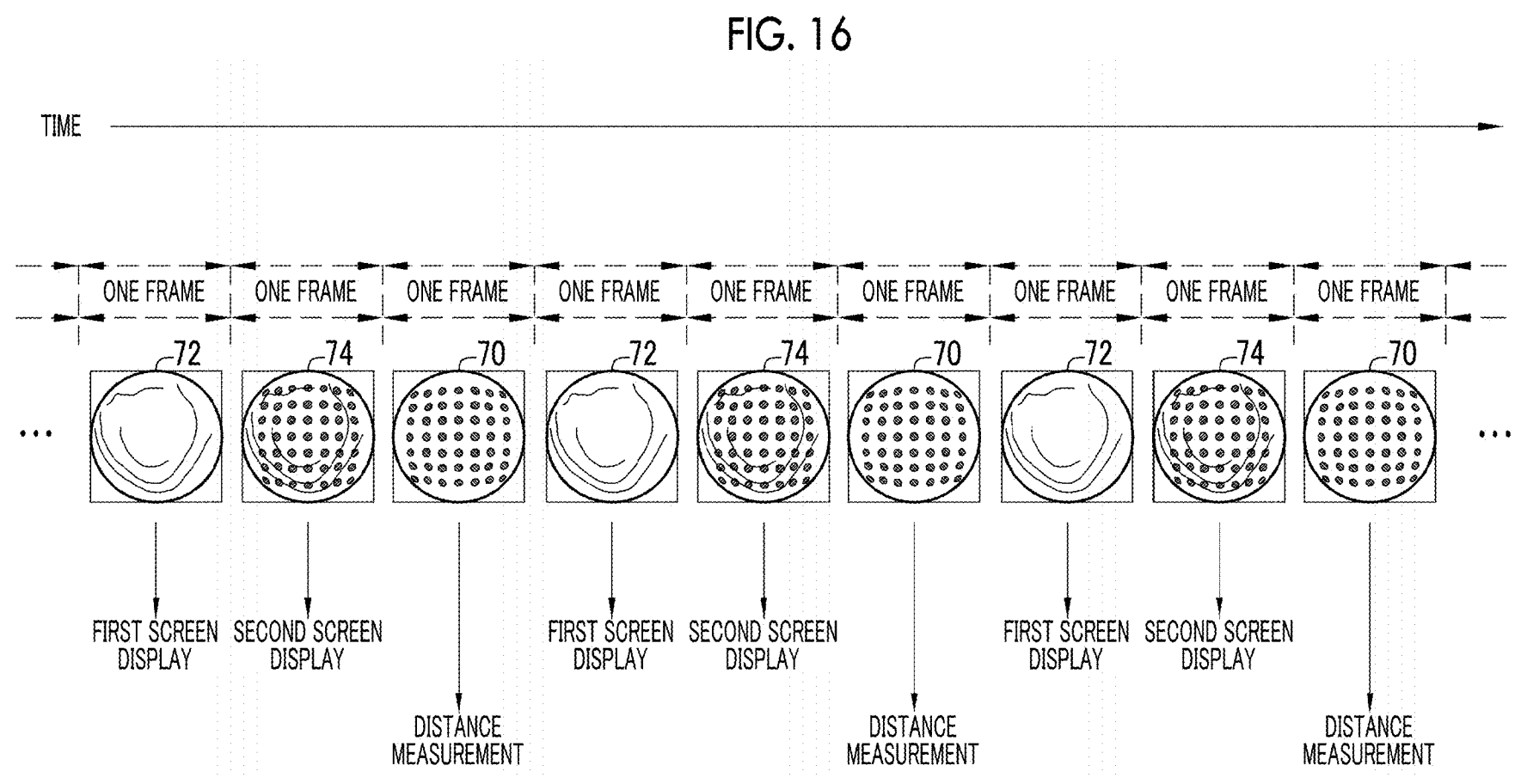

As shown in FIG. 16, in the seventh observation pattern, the measurement light image 70 captured by the measurement irradiation, the observation endoscope image 72 captured by observation irradiation, and the dual-light endoscope image 74 captured the measurement point confirmation irradiation are acquired by switching at an optional ratio, and the generated observation endoscope image 72 and the generated dual-light endoscope image 74 are displayed in two screens. In the seventh observation pattern, the image display is performed in which the illumination light is always emitted at a light intensity equal to or greater than a predetermined intensity, and the measurement point can be confirmed.

Each observation pattern may be set in advance such that the observation pattern can be switched by a user operation during the examination. For example, the switching may be performed by further pressing the mode selector switch 11*e* used for switching the observation mode, or by pressing an observation pattern selector switch (not shown) provided in the endoscope 11 or the user interface 15. In addition, the observation pattern may be divided into an imaging pattern which is a pattern for acquiring each imaging signal and a display pattern for controlling the display of each acquired imaging signal, and may be set to be switchable to any combination of the imaging pattern and the display pattern.

As shown in FIG. 17, the projection pattern, which is a shape in a case of being projected by the measurement light, may be optionally set instead of the dot pattern arranged in a lattice form. For example, in addition to the dot pattern, there are a line pattern, a cross pattern, a striped pattern, a scale pattern, a combination pattern, and the like, and shapes such as points or lines may be projected in any number or arrangement. In a case of using lines, it is preferable to use a broken line or a dotted line in addition to a solid line. For example, in a case in which a plurality of lines are projected side by side, an aspect in which a solid line and a dotted line are repeated is used.

In the dot pattern, dots or small circles are projected onto the subject S as shown in FIG. 7A. The distance measurement is performed at the position (spot) of each dot of the measurement light. As in the line pattern and the cross pattern, a shape in which a plurality of projected lines cross or a shape in which the plurality of projected lines do not cross may be selectively used depending on the subject S.

In addition, there are types such as a single type, a repetitive type, a circular type, a center dot type, and a special type in which each shape is projected asymmetrically or randomly, or in which projection does not apply to any of them. In the volume measurement, it is necessary to acquire a plurality of pieces of distance information, so that it is necessary to associate a plurality of measurement images 71 in the single type. Therefore, it is preferable to adopt a projection pattern in which a plurality of measurement points are provided for one measurement light image.

Figure 18:
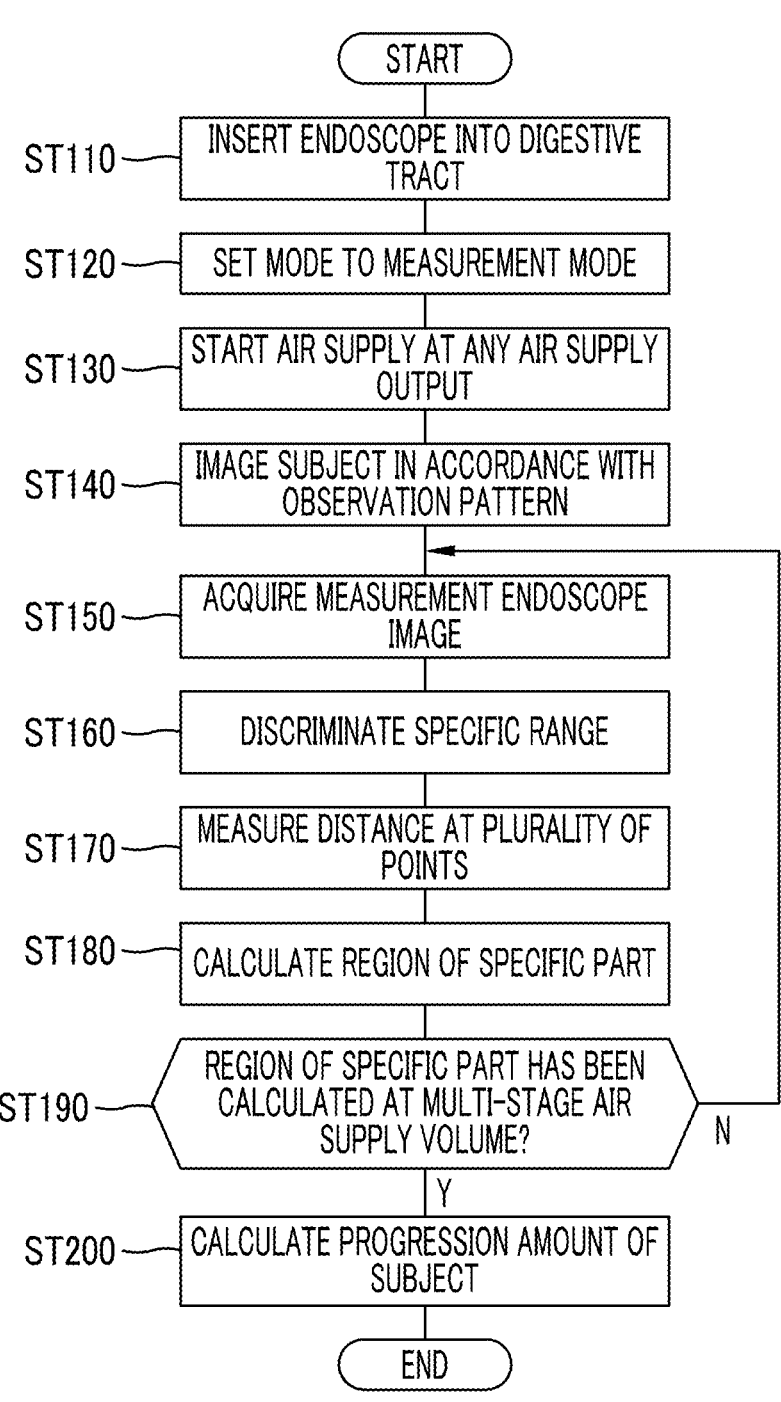
FIG. 18 is a flowchart showing a series of flows of three-dimensional measurement of an exemplary embodiment of the invention.

A series of flows of an operation of performing the three-dimensional measurement of the subject in the measurement mode in the endoscope system 10 will be described with reference to the flowchart shown in FIG. 18. The insertion part 11*a* of the endoscope 11 is inserted into the digestive tract, which is the subject (step ST110). The endoscope system 10 sets the observation mode to the measurement mode in response to a user operation with respect to any of the endoscope 11, the light source device 12, or the processor device 13 (step ST120). The air supply is started at any air supply output such as preset air supply output in response to the start of the measurement mode due to the switching of the observation mode or the like (step ST130). The subject is imaged in any observation pattern at the start of the air supply (step ST140).

In any observation pattern, the measurement light image 70 is acquired by imaging the subject by emitting the measurement light and by emitting the illumination light at a light intensity suppressed relative to the measurement light or turning off the illumination light (step ST150). The specific part, which is an observation site, is discriminated from at least any of the measurement light image 70, the observation endoscope image 72, or the dual-light endoscope image 74 (step ST160). The distances are measured at a plurality of points from the spot light projected onto the specific part of the measurement light image 70 (step ST170). The two-dimensional region or the three-dimensional region of the specific part is calculated based on the distance measurement result of the specific part (step ST180).

In the measurement mode, the subject S is observed at a multi-stage air supply volume, and the region of the specific part is observed. In a case in which the region of the specific part has been calculated at the multi-stage air supply volume (Y in step ST190), the progression amount of the digestive tract is calculated by using a plurality of pieces of the distance information (step ST200). In a case in which the region of the specific part has not been calculated at the multi-stage air supply volume (N in step ST190), the imaging is performed at different stages of the air supply volume to acquire the measurement light image 70 (step ST150).

After the progression amount of the digestive tract is calculated, the mode is switched from the measurement mode to the normal observation mode, and the series of flows is ended. The endoscopic observation may be ended as it is instead of switching to the normal observation mode.

Although the light source device 12 comprising the measurement light source 32 that emits the measurement light, which is the pattern light, has been described as an example, the light source device 12 that emits the measurement light of a plurality of colors may be used. For example, the measurement mode may be executed in the light source device 12 comprising three types of measurement light sources that emit light beams having wavelength ranges different from each other. Hereinafter, as a modification example, a projection pattern of the measurement light using three types of measurement light sources will be described. The contents other than the measurement light are the same as in the above-described example, and thus the description thereof will be omitted.

Figures 19, 20:
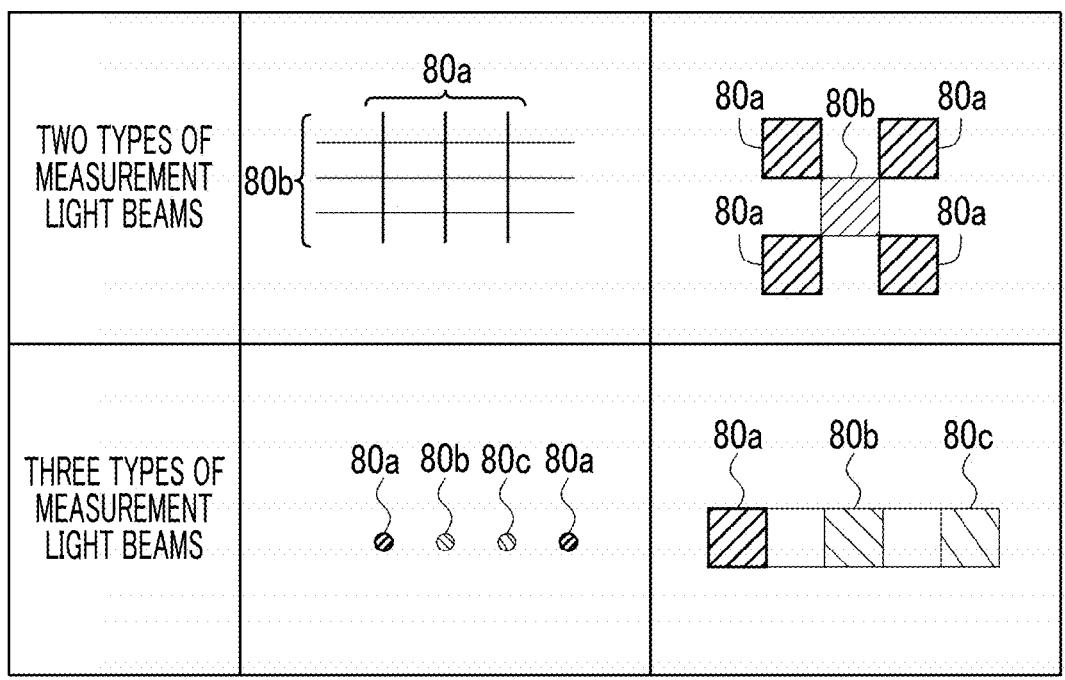
FIG. 19 is an explanatory diagram of a light source device in a modification example.
FIG. 20 is an explanatory diagram of a projection pattern with measurement light in the modification example.

As shown in FIG. 19, in a case in which the three types of measurement light sources that emit light beams having different wavelengths are used, for example, the light source device 12 comprises a measurement light source 32 including a first measurement light source 32*a* that emits green light as first measurement light, a second measurement light source 32*b* that emits red light as second measurement light, and a third measurement light source 32*c* that emits blue light as third measurement light. The light emission controller 34 transmits drive currents to the illumination light source 30 and the first measurement light source 32*a*, the second measurement light source 32*b*, and the third measurement light source 32*c* in the measurement light source 32 independently to control the light intensity, turn-off timing, or the like.

As shown in FIG. 20, in a projection pattern using a plurality of measurement light beams, the measurement light beams are distinguished based on components such as a single point, a line, and a stripe pattern, and different measurement light beams are projected onto the subject. In a projection pattern composed of two types of measurement light beams, that is, first measurement light and second measurement light, in the cross pattern, vertical lines are projected with a green light projection portion 80*a* using the first measurement light, and horizontal lines are projected with a red light projection portion 80*b* using the second measurement light. In addition, in the striped pattern, odd-numbered rows such as a first row and a third row counted from the top are projected with the green light projection portion 80*a*, and even-numbered rows such as a second row are projected with the red light projection portion 80*b*.

In a projection pattern composed of three types of measurement light beams, that is, first measurement light, second measurement light, and third measurement light, in the dot pattern, the green light projection portion 80*a* using the first measurement light, the red light projection portion 80*b* using the second measurement light, and the blue light projection portion 80*c* using the third measurement light are projected in this order from a single point on a left side. In addition, in the striped pattern, the green light projection portion 80*a*, the red light projection portion 80*b*, and the blue light projection portion 80*c* are projected from the left side in the same manner.

The number of types of measurement light beams having different wavelengths is not limited to three, and four or more types of light sources may be used. In addition, it is preferable to appropriately change the shape of the emitted projection pattern and the color-coding method depending on the application.

In the above embodiment, the hardware structure of a processing unit that executes various kinds of processing, such as the light emission controller 34, the imaging controller 45, the image signal acquisition unit 50, the DSP 51, the noise reduction unit 52, the image processing unit 53, the output controller 54, and the distance measurement processing unit 60, is various processors as follows. The various processors include a central processing unit (CPU) that is a general-purpose processor that executes software (programs) to function as various processing units, a graphical processing unit (GPU), a programmable logic device (PLD) that is a processor capable of changing a circuit configuration after manufacture, such as a field programmable gate array (FPGA), and an exclusive electric circuit that is a processor having a circuit configuration exclusively designed to execute various kinds of processing.

One processing unit may be configured of one of these various processors, or may be configured of a combination of two or more processors of the same type or different types (for example, a plurality of FPGAs, a combination of a CPU and an FPGA, or a combination of a CPU and a GPU). In addition, a plurality of processing units may be configured of one processor. As an example in which the plurality of processing units are configured of one processor, first, as typified by computers such as a client or a server, one processor is configured of a combination of one or more CPUs and software, and this processor functions as the plurality of processing units. Second, as typified by a system on chip (SoC) or the like, a processor that realizes the functions of the entire system including the plurality of processing units by using one integrated circuit (IC) chip is used. As described above, the various processing units are configured using one or more of the various processors as a hardware structure.

Furthermore, the hardware structure of the various processors is more specifically an electric circuit (circuitry) having a form in which circuit elements such as semiconductor elements are combined. In addition, a hardware structure of a storage unit is a storage device such as a hard disc drive (HDD) or a solid state drive (SSD). In addition, from the above description, it is possible to grasp the endoscope system described in Appendices 1 to 13.

APPENDIX 1

An endoscope system comprising:

an endoscope that images a subject;

an air supply device that is connected to the endoscope and that supplies air at a multi-stage air supply volume through a distal end part of the endoscope; and a processor, in which the processor controls emission of illumination light with which the subject is illuminated and measurement light for measuring a distance between a plurality of points on the subject and the endoscope, in a state in which the air supply volume is a first air supply volume, acquires a first imaging signal from the endoscope that images the subject by emitting the measurement light and by emitting the illumination light at a light intensity suppressed relative to the measurement light or turning off the illumination light, in a state in which the air supply volume is a second air supply volume at a stage different from the first air supply volume, acquires a second imaging signal from the endoscope that images the subject by emitting the measurement light and by emitting the illumination light at a light intensity suppressed relative to the measurement light or turning off the illumination light, calculates a region of the subject from first distance information obtained by measuring the distance between the plurality of points on the subject and the endoscope based on the first imaging signal, and calculates a region of the subject from second distance information obtained by measuring the distance between the plurality of points on the subject and the endoscope based on the second imaging signal.

APPENDIX 2

The endoscope system according to Appendix 1, in which the endoscope images the subject by dividing the subject for each specific angle according to a field of view, and the processor measures the first distance information based on a plurality of first division imaging signals obtained by imaging the subject for each specific angle, and measures the second distance information based on a plurality of second division imaging signals obtained by imaging the subject for each specific angle.

APPENDIX 3

The endoscope system according to Appendix 1 or 2, in which the processor discriminates a specific part in the subject, calculates a region of the specific part from the first distance information, and calculates a region of the specific part from the second distance information.

APPENDIX 4

The endoscope system according to any one of Appendices 1 to 3, in which the measurement light is pattern light in which spot light beams are arranged in a lattice form.

APPENDIX 5

The endoscope system according to any one of Appendices 1 to 4, in which the region is at least any one of a length which is a one-dimensional region, a surface area which is a two-dimensional region, or a volume which is a three-dimensional region.

APPENDIX 6

The endoscope system according to any one of Appendices 1 to 5, in which the endoscope applies a light intensity threshold value that is a preset threshold value of a light intensity in the emission of the measurement light and the illumination light, and in a case in which the measurement light is emitted and the illumination light is emitted at a light intensity suppressed relative to the measurement light, performs measurement irradiation in which the measurement light is emitted at a light intensity equal to or greater than the light intensity threshold value and the illumination light is emitted at a light intensity less than the light intensity threshold value.

APPENDIX 7

The endoscope system according to Appendix 6, in which the endoscope continuously images the subject by switching between the measurement irradiation and observation irradiation in which the subject is irradiated with the illumination light at a light intensity equal to or greater than the light intensity threshold value, and the processor displays, on a screen, an observation endoscope image generated by imaging the subject with the observation irradiation.

APPENDIX 8

The endoscope system according to Appendix 6, in which the endoscope continuously images the subject by switching between the measurement irradiation and measurement point confirmation irradiation in which the subject is irradiated with the illumination light and the measurement light at a light intensity equal to or greater than the light intensity threshold value, and the processor displays, on a screen, a dual-light endoscope image generated by imaging the subject with the measurement point confirmation irradiation.

APPENDIX 9

The endoscope system according to Appendix 7 or 8, in which the processor displays, on a screen, a measurement light image generated by imaging the subject with the measurement irradiation.

APPENDIX 10

The endoscope system according to Appendix 9, in which the processor performs different screen displays for each type of the generated image.

APPENDIX 11

The endoscope system according to Appendix 6, in which the endoscope continuously images the subject by switching between the measurement irradiation, observation irradiation in which the illumination light is emitted at a light intensity equal to or greater than the light intensity threshold value, and measurement point confirmation irradiation in which the subject is irradiated with the illumination light and the measurement light at a light intensity equal to or greater than the light intensity threshold value, and the processor displays, on different screens, an observation endoscope image generated by imaging the subject with the observation irradiation and a dual-light endoscope image generated by imaging the subject with the measurement point confirmation irradiation.

APPENDIX 12

An endoscope system comprising:

an endoscope that images a subject;

an air supply device that is connected to the endoscope and that supplies air at a multi-stage air supply volume from a distal end part of the endoscope; and a processor, in which the processor controls emission of illumination light with which the subject is illuminated and measurement light for measuring a distance between the subject and the endoscope, in a state in which the air supply device supplies air at a first air supply volume, acquires a first imaging signal from the endoscope that images the subject by emitting the measurement light and by emitting the illumination light at a light intensity suppressed relative to the measurement light or turning off the illumination light, in a state in which the air supply device supplies air at a second air supply volume at a stage different from the first air supply volume, acquires a second imaging signal from the endoscope that images the subject by emitting the measurement light and by emitting the illumination light at a light intensity suppressed relative to the measurement light or turning off the illumination light, and calculates and outputs an index value representing an extension amount of the subject by using a difference between first distance information obtained by measuring distances between a plurality of points on the subject and the endoscope based on the first imaging signal and second distance information obtained by measuring the distance between the plurality of points on the subject and the endoscope based on the second imaging signal.

APPENDIX 13

The endoscope system according to Appendix 12,
in which the processor calculates a volume of the subject
    based on the index value.

EXPLANATION OF REFERENCES

10: endoscope system
11: endoscope
11*a*: insertion part
11*b*: operation part
11*c*: bendable part
11*d*: distal end part
11*e*: mode selector switch
11*f*: air supply switch
11*g*: body part forceps port
12: light source device
13: processor device
14: display
15: user interface
16: air supply device
17: pressure gauge
21: illumination lens
22: objective lens
23: measurement light emitting unit
24: air supply nozzle
25: distal end part forceps port
30: illumination light source
32: measurement light source
32*a*: first measurement light source
32*b*: second measurement light source
32*c*: third measurement light source
34: light emission controller
36: light guide
38: illumination optical system
40: imaging optical system
44: imaging sensor
45: imaging controller
46: CDS/AGC circuit
48: A/D converter
50: image signal acquisition unit
51: DSP
52: noise reduction unit
53: image processing unit
54: output controller
60: distance measurement processing unit
62: distance measurement unit
64: specific part discrimination unit
66: region calculation unit
68: air supply controller
70: measurement light image
72: observation endoscope image
74: dual-light endoscope image
76: healthy curve
78: functional disease curve
80: measurement light pattern
80*a*: green light projection portion
80*b*: red light projection portion
80*c*: blue light projection portion
82: specific part
Ax: rotation axis
BS: balloon
D: digestive tract
H: viewpoint
P0: reference internal pressure value
P1: internal pressure value P2: internal pressure value
R: imaging range
S: subject
ST110 to ST200: step
V0: reference volume value
V1: volume value
W: volume width

What is claimed is:

1. An endoscope system comprising:
an endoscope that images a subject;
an air supply device that is connected to the endoscope
    and performs air supply at multiple stages of air volume
    through a distal end part of the endoscope; and
a processor,
wherein the processor is configured to
    control emission of illumination light for illuminating
        the subject and measurement light for measuring
        distances between a plurality of points on the subject
        and the endoscope,
    in a state in which the air supply volume is a first air
        supply volume, acquire a first imaging signal from
        the endoscope that images the subject by emitting the
        measurement light and by emitting the illumination
        light at a light intensity suppressed relative to the
        measurement light or turning off the illumination
        light,
    in a state in which the air supply volume is a second air
        supply volume at a stage different from the first air
        supply volume, acquire a second imaging signal
        from the endoscope that images the subject by emit-
        ting the measurement light and by emitting the
        illumination light at a light intensity suppressed
        relative to the measurement light or turning off the
        illumination light, wherein the first imaging signal
        and the second imaging signal are acquired at uni-
        form time intervals to measure a speed of distension
        of the subject,
    calculate a region of the subject from first distance
        information obtained by measuring the distances
        between the plurality of points on the subject and the
        endoscope based on the first imaging signal, and
    calculate a region of the subject from second distance
        information obtained by measuring the distances
        between the plurality of points on the subject and the
        endoscope based on the second imaging signal.

2. The endoscope system according to claim 1,
wherein the endoscope images the subject by dividing the
    subject into specific angles according to a field of view,
    and
the processor is configured to
    measure the first distance information based on a
        plurality of first division imaging signals obtained by
        imaging the subject for each specific angle, and
    measure the second distance information based on a
        plurality of second division imaging signals obtained
        by imaging the subject for each specific angle.

3. The endoscope system according to claim 1,
wherein the processor is configured to
    discriminate a specific part in the subject,
    calculate a region of the specific part from the first
        distance information, and
    calculate a region of the specific part from the second
        distance information.

4. The endoscope system according to claim 1,
wherein the measurement light is pattern light in which
    spot light beams are arranged in a lattice form.

5. The endoscope system according to claim 1,
wherein the region is at least one of a length, which is a
one-dimensional region, a surface area, which is a
two-dimensional region, or a volume, which is a three-
dimensional region.

6. The endoscope system according to claim 1,
wherein the endoscope
applies a light intensity threshold value that is a preset
threshold value of a light intensity in the emission of
the measurement light and the illumination light, and
in a case in which the measurement light is emitted and
the illumination light is emitted at a light intensity
suppressed relative to the measurement light, per-
forms measurement irradiation by emitting the mea-
surement light at a light intensity equal to or greater
than the light intensity threshold value and the illu-
mination light at a light intensity less than the light
intensity threshold value.

7. The endoscope system according to claim 6,
wherein the endoscope continuously images the subject
by switching between the measurement irradiation and
observation irradiation, in which the illumination light
is emitted at a light intensity equal to or greater than the
light intensity threshold value, and
the processor is configured to display, on a screen, an
observation endoscope image generated by imaging the
subject with the observation irradiation.

8. The endoscope system according to claim 6,
wherein the endoscope continuously images the subject
by switching between the measurement irradiation and
measurement point confirmation irradiation, in which
the illumination light and the measurement light are
emitted at a light intensity equal to or greater than the
light intensity threshold value, and
the processor is configured to display, on a screen, a
dual-light endoscope image generated by imaging the
subject with the measurement point confirmation irra-
diation.

9. The endoscope system according to claim 7,
wherein the processor is configured to display, on a
screen, a measurement light image generated by imag-
ing the subject with the measurement irradiation.

10. The endoscope system according to claim 9,
wherein the processor is configured to perform different
screen displays for each type of generated image.

11. The endoscope system according to claim 6,
wherein the endoscope continuously images the subject
by switching between the measurement irradiation,
observation irradiation, in which the illumination light
is emitted at a light intensity equal to or greater than the
light intensity threshold value, and measurement point
confirmation irradiation, in which the illumination light
and the measurement light are emitted at a light inten-
sity equal to or greater than the light intensity threshold
value, and
the processor is configured to display, on different
screens, an observation endoscope image generated by
imaging the subject with the observation irradiation and
a dual-light endoscope image generated by imaging the
subject with the measurement point confirmation irra-
diation.

12. An endoscope system comprising:
an endoscope that images a subject;
an air supply device that is connected to the endoscope
and performs air supply at multiple stages of air volume
from a distal end part of the endoscope; and
a processor,

28 wherein the processor is configured to
control emission of illumination light for illuminating
the subject and measurement light for measuring
distances between the subject and the endoscope,
in a state in which the air supply device supplies air at
a first air supply volume, acquire a first imaging
signal from the endoscope that images the subject by
emitting the measurement light and by emitting the
illumination light at a light intensity suppressed
relative to the measurement light or turning off the
illumination light,
in a state in which the air supply device supplies air at
a second air supply volume at a stage different from
the first air supply volume, acquire a second imaging
signal from the endoscope that images the subject by
emitting the measurement light and by emitting the
illumination light at a light intensity suppressed
relative to the measurement light or turning off the
illumination light, wherein the first imaging signal
and the second imaging signal are acquired at uni-
form time intervals to measure a speed of distension
of the subject, and
calculate and output an index value representing an
extension amount of the subject by using a difference
between first distance information obtained by mea-
suring the distances between a plurality of points on
the subject and the endoscope based on the first
imaging signal and second distance information
obtained by measuring the distances between the
plurality of points on the subject and the endoscope
based on the second imaging signal.

13. The endoscope system according to claim 12,
wherein the processor is configured to calculate a volume
of the subject based on the index value.

14. A method of operating an endoscope system, com-
prising:
via an air supply device, supplying air at multiple stages
of air volume through a distal end part of an endoscope
that images a subject;
controlling emission of illumination light for illuminating
the subject and measurement light for measuring dis-
tances between a plurality of points on the subject and
the endoscope;
acquiring a first imaging signal from the endoscope that
images the subject by emitting the measurement light
and by emitting the illumination light at a light intensity
suppressed relative to the measurement light or turning
off the illumination light, in a state in which the air
supply volume is a first air supply volume;
acquiring a second imaging signal from the endoscope
that images the subject by emitting the measurement
light and by emitting the illumination light at a light
intensity suppressed relative to the measurement light
or turning off the illumination light, in a state in which
the air supply volume is a second air supply volume at
a stage different from the first air supply volume,
wherein the first imaging signal and the second imaging
signal are acquired at uniform time intervals to measure
a speed of distension of the subject;
calculating a region of the subject from first distance
information obtained by measuring the distances
between the plurality of points on the subject and the
endoscope based on the first imaging signal; and
calculating a region of the subject from second distance
information obtained by measuring the distances between the plurality of points on the subject and the endoscope based on the second imaging signal.

\* \* \* \* \*